(12) United States Patent
Sylvain

(10) Patent No.: US 8,180,338 B1
(45) Date of Patent: May 15, 2012

(54) SELECTIVE CALL ANCHORING IN A MULTIMEDIA SUBSYSTEM

(75) Inventor: Dany Sylvain, Gatineau (CA)

(73) Assignee: Genband US LLC, Plano, TX (US)

( * ) Notice: Subject to any disclaimer, the term of this patent is extended or adjusted under 35 U.S.C. 154(b) by 846 days.

(21) Appl. No.: 11/452,743

(22) Filed: Jun. 14, 2006

(51) Int. Cl.
*H04W 4/00* (2009.01)
*H04W 36/00* (2009.01)

(52) U.S. Cl. .................. 455/422.1; 455/436

(58) Field of Classification Search .......... 455/445, 455/448, 422.1, 436–444, 456.1–456.6; 370/349, 370/331–334, 352–356; 379/229, 352
See application file for complete search history.

(56) References Cited

U.S. PATENT DOCUMENTS

| | | | |
|---|---|---|---|
| 5,497,411 A | 3/1996 | Pellerin | |
| 6,067,453 A | 5/2000 | Adiwoso et al. | |
| 6,208,627 B1 | 3/2001 | Menon et al. | |
| 6,353,596 B1 | 3/2002 | Grossglauser et al. | |
| 6,614,897 B1 | 9/2003 | Curtis et al. | |
| 6,721,565 B1 | 4/2004 | Ejzak et al. | |
| 6,801,615 B2 | 10/2004 | Stumer et al. | |
| 6,961,774 B1 | 11/2005 | Shannon et al. | |
| 6,970,459 B1 | 11/2005 | Meier | |
| 6,999,770 B2 * | 2/2006 | Hirsbrunner et al. | 455/445 |
| 7,099,309 B2 | 8/2006 | Davidson | |
| 7,206,582 B2 | 4/2007 | Tom et al. | |
| 7,313,666 B1 | 12/2007 | Saminda De Silva et al. | |
| 7,492,886 B1 | 2/2009 | Kalmanek, Jr. et al. | |
| 7,664,495 B1 | 2/2010 | Bonner et al. | |
| 7,729,489 B2 | 6/2010 | Lee et al. | |
| 8,045,568 B2 | 10/2011 | Sylvain et al. | |
| 2001/0055982 A1 | 12/2001 | Umeda | |
| 2002/0133600 A1 | 9/2002 | Williams et al. | |
| 2002/0188562 A1 | 12/2002 | Igarashi et al. | |
| 2003/0027569 A1 | 2/2003 | Ejzak | |
| 2003/0148765 A1 | 8/2003 | Ma et al. | |
| 2003/0174688 A1 | 9/2003 | Ahmed et al. | |

(Continued)

FOREIGN PATENT DOCUMENTS

CA 2 501 991 A1 4/2004

(Continued)

OTHER PUBLICATIONS

Interview Summary for U.S. Appl. No. 11/466,115 (Oct. 18, 2011).

(Continued)

*Primary Examiner* — Michael Faragalla
(74) *Attorney, Agent, or Firm* — Jenkins, Wilson, Taylor & Hunt, P.A.

(57) ABSTRACT

The present invention dynamically determines whether call control for a call from a user element should be anchored in a multimedia subsystem (MS) or in a circuit-switched subsystem (CS) based on the location of the user element. Calls may be anchored in the MS regardless of whether the user element is currently served by a cellular network of the CS or a WLAN of the MS. In particular, the anchoring decision is based on whether the user element is within an MS anchoring zone, which defines an area or areas where calls for the user element should be anchored in the MS. Accordingly, when the user element is outside of the MS anchoring zone, calls for the user element are not anchored in the MS. When the user element is within the MS anchoring zone, calls for the user element are anchored in the MS.

27 Claims, 18 Drawing Sheets

U.S. PATENT DOCUMENTS

| | | | |
|---|---|---|---|
| 2004/0002335 A1 | 1/2004 | Pan et al. | |
| 2004/0003046 A1 | 1/2004 | Grabelsky et al. | |
| 2004/0028080 A1 | 2/2004 | Samarasinghe et al. | |
| 2004/0067754 A1* | 4/2004 | Gao et al. | 455/442 |
| 2004/0157600 A1 | 8/2004 | Stumpert et al. | |
| 2004/0219905 A1 | 11/2004 | Blumenthal et al. | |
| 2004/0229469 A1 | 11/2004 | Marsh et al. | |
| 2004/0246990 A1 | 12/2004 | Krishnamurthi et al. | |
| 2004/0249887 A1 | 12/2004 | Garcia-Martin et al. | |
| 2005/0002407 A1 | 1/2005 | Shaheen et al. | |
| 2005/0003797 A1 | 1/2005 | Baldwin | |
| 2005/0003821 A1 | 1/2005 | Sylvain | |
| 2005/0243870 A1 | 11/2005 | Balogh et al. | |
| 2005/0245261 A1 | 11/2005 | Ejzak | |
| 2005/0265304 A1* | 12/2005 | Kim et al. | 370/349 |
| 2005/0286531 A1 | 12/2005 | Tuohino et al. | |
| 2006/0002355 A1 | 1/2006 | Baek et al. | |
| 2006/0002380 A1 | 1/2006 | Bollinger et al. | |
| 2006/0034270 A1 | 2/2006 | Haase et al. | |
| 2006/0083199 A1 | 4/2006 | Yang | |
| 2006/0094431 A1* | 5/2006 | Saifullah et al. | 455/436 |
| 2006/0142004 A1 | 6/2006 | He et al. | |
| 2006/0187904 A1 | 8/2006 | Oouchi | |
| 2006/0209805 A1 | 9/2006 | Mahdi | |
| 2006/0217112 A1 | 9/2006 | Mo | |
| 2006/0268928 A1 | 11/2006 | Barzegar et al. | |
| 2007/0004415 A1 | 1/2007 | Abedi | |
| 2007/0014281 A1 | 1/2007 | Kant | |
| 2007/0041367 A1 | 2/2007 | Mahdi | |
| 2007/0058788 A1 | 3/2007 | Mahdi et al. | |
| 2007/0066304 A1 | 3/2007 | Lee | |
| 2007/0072605 A1 | 3/2007 | Poczo | |
| 2007/0100981 A1 | 5/2007 | Adamczyk et al. | |
| 2007/0206568 A1 | 9/2007 | Silver et al. | |
| 2008/0025263 A1 | 1/2008 | Pelkonen | |
| 2008/0144637 A1 | 6/2008 | Sylvain et al. | |
| 2008/0160991 A1 | 7/2008 | Constantinof et al. | |
| 2008/0268818 A1 | 10/2008 | Keller et al. | |
| 2009/0190579 A1 | 7/2009 | Witzel et al. | |
| 2010/0124897 A1 | 5/2010 | Edge | |

FOREIGN PATENT DOCUMENTS

| | | |
|---|---|---|
| CN | 101292489 A | 11/2008 |
| EP | 1 920 572 A2 | 3/2007 |
| EP | 1 816 877 A1 | 8/2007 |
| EP | 1 965 592 A1 | 9/2008 |
| WO | WO 00/60785 | 10/2000 |
| WO | WO 01/03450 A1 | 1/2001 |
| WO | WO 01/22657 A1 | 3/2001 |
| WO | WO 2004/019173 A2 | 3/2004 |
| WO | WO 2004/073279 A1 | 8/2004 |
| WO | WO 2006/097837 A1 | 9/2006 |
| WO | WO 2006/105732 A1 | 10/2006 |
| WO | WO 2006/126072 A1 | 11/2006 |
| WO | WO 2007/023358 A2 | 3/2007 |
| WO | WO 2008/038101 A2 | 4/2008 |

OTHER PUBLICATIONS

Official Action for U.S. Appl. No. 11/466,115 (Jul. 12, 2011).
Communication pursuant to Article 94(3) EPC for European Application No. 07024903.2 (Apr. 2, 2009).
Non-Final Official Action for U.S. Appl. No. 11/554,930 (Jul. 7, 2011).
Notice of Allowance and Fee(s) Due for U.S. Appl. No. 11/536,921 (Jun. 30, 2011).
Decision on Petition to Revive for U.S. Appl. No. 11/466,115 (Jun. 28, 2011).
Final Official Action for U.S. Appl. No. 11/440,165 (Jun. 22, 2011).
Notice of Abandonment for U.S. Appl. No. 11/466,115 (May 11, 2011).
Notice of Panel Decision from Pre-Appeal Brief Review for U.S. Appl. No. 11/554,930 (Apr. 19, 2011).
Chinese Official Action for Chinese patent application No. 200680039435.0 (Mar. 22, 2011).
Final Official Action for U.S. Appl. No. 11/378,776 (Mar. 9, 2011).
Final Official Action for U.S. Appl. No. 11/616,679 (Feb. 25, 2011).
Official Action for U.S. Appl. No. 11/440,165 (Feb. 16, 2011).
Official Action for U.S. Appl. No. 11/536,921 (Dec. 3, 2010).
Final Official Action for U.S. Appl. No. 11/554,930 (Dec. 3, 2010).
Final Official Action for U.S. Appl. No. 11/466,115 (Oct. 12, 2010).
Official Action for U.S. Appl. No. 11/378,776 (Aug. 18, 2010).
Official Action for U.S. Appl. No. 11/616,679 (Aug. 13, 2010).
Official Action for U.S. Appl. No. 11/440,165 (Aug. 4, 2010).
Non-Final Official Action for U.S. Appl. No. 11/554,930 (Apr. 14, 2010).
Final Official Action for U.S. Appl. No. 11/536,921 (Mar. 4, 2010).
Official Action for U.S. Appl. No. 11/466,115 (Feb. 2, 2010).
Final Official Action for U.S. Appl. No. 11/554,930 (Sep. 2, 2009).
Official Action for U.S. Appl. No. 11/536,921 (Jul. 21, 2009).
Official Action for U.S. Appl. No. 11/466,115 (Jun. 23, 2009).
Non-Final Official Action for U.S. Appl. No. 11/554,930 (Feb. 6, 2009).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008). (Part 1 of 2, pp. 1-285).
3GPP, "3rd Generation Partnership Project; Technical Specification Group Core Network and Terminals; Mobile Radio Interface Layer 3 Specification; Core Network Protocols; Stage 3 (Release 8)," 3GPP TS 24.008 V8.4.0 (Dec. 2008). (Part 2 of 2, pp. 286-571).
Commonly-assigned, co-pending U.S. Appl. No. 12/209,829 for "Adding a Service Control Channel After Session Establishment," (Unpublished, filed Sep. 12, 2008).
European Search Report for EP 07024903 (Jul. 23, 2008).
3RD Generation Partnership Project (3GPP), "IP Multimedia Subsystem (IMS) Centralized Services," Technical Specification 3GPP TS 23.292 v8.0.0, Stage 2, Release 8, 3GPP Organizational Partners (Jun. 2008).
3GPP, "3rd Generation Partnership Project; Technical Specification Group Services and System Aspects; IP Miltimedia Subsystem (IMS) Centralized Services (Release 8)," 3GPP TS 23.892 V8.0.1 (Mar. 2008).
International Search Report for PCT/IB2007/002787 (Mar. 7, 2008).
3GPP, "3rd Generation Partnership Project; Technical Specification Group Services and System Aspects; IP Miltimedial Subsystem (IMS); Stage 2 (Release 8)," 3GPP TS 23.228 V8.1.0 (Jun. 2007).
3GPP, "3rd Generation Partnership Project; Technical Specification Group Core Network and Terminals; Mobile Radio Interface Layer 3 Specification; Core Network Protocols; Stage 3 (Release 7)," 3GPP TS 24.008 V7.8.0 (Jun. 2007).
International Search Report for PCT/IB2006/002282 (Feb. 2, 2007).
3GPP SA WG2, "3rd Generation Partnership Project; Technical Specification Group Core Network and Terminals; Voice Call Continuity Between the Circuit-Switched (CS) Domain and the IP Multimedia (IP) Core Network (CN) Subsystem; Stage 3 (Release 7), TS 24.206 V.7.0.0," Technical Specification (TS), Dec. 8, 2006, pp. 1-114, vol. 24.206 No. V7.0.0, 3GPPP Organizational Partners' Publications Offices.
3GPP CT WG1, "3rd Gneration Partnership Project; Technical Specification Group Services and Systems Aspects; voice Call Continuity (VCC) Between Circuit Switched (CS) and IP Multimedia Subsystem (IMS); Stage 2 (Release 7), TS 23.206 V7.1.0," Technical Specification (TS), Dec. 1, 2006, pp. 1-36, vol. 23.206 No. V7.1.0, 3GPP Organizational Partner's Publications Offices.
International Search Report for PCT/IB2006/001564, Mailed Nov. 14, 2006.
International Search Report for PCT/IB2006/001362 (Oct. 5, 2006).
"3rd Generation Partnership Project; Technical Specification Group Core Network and Terminals; Mobile radio interface Layer 3 specification; Core network protocols; Stage 3 (Release 7)," 3GPP TS 24.008 V7.5.0, pp. 1-538 (Sep. 2006).
"3rd Generation Partnership Project; Technical Specification Group Services and System Aspects; IP Multimedia Subsystem (IMS); Stage 2 (Release 7)," 3GPP TS 23.228 V7.5.0, pp. 1-214 (Sep. 2006).
International Search Report for PCT/IB2006/000607 (Aug. 28, 2006).

3GPP, "3rd Generation Partnership Project; Technical Specification Group Services and System Aspects; Voice Call Continuity Between CS and IMS; Stage 2 (Release 7)," 3GPP TS 23.206 V1.1.0 (Jul. 2006).

"3rd Generation Partnership Project; Technical Specification Group Core Network and Terminals; Mobile radio interface Layer 3 specification; Core network protocols; Stage 3 (Release 7)," 3GPP TS 24.008, V7.4.0, pp. 1-534 (Jun. 2006).

3GPP, "3rd Generation Partnership Project; Technical Specification Group Services and System Aspects; Multimedia Broadcast/Multicast Service (MBMS); Architecture and Functional Description (Release 6)," 3GPP TS 23.246 V6.10.0 (Jun. 2006).

3GPP TSG-SA WG2 Meeting #46, Technical Document: Tdoc S2-050995, Service Continuity—Network Domain Selection (May 13, 2006).

3GPP SA WG2, "Voice Call Continuity Between CS and IMS Study (3GPP TR 23.806 version 7.00.0 Release 7)," Technical Specification (TS), Dec. 1, 2005, pp. 1-153, vol. 23.806 No. V7.0.0, 3GPP Organizational Partners' Publications Offices.

3GPP, "3rd Generation Partnership Project; Technical Specification Group Services and System Aspects; Voice Call Continuity Between CS and IMS Study (Release 7)," 3GPP TR 23.806 V1.4.0 Aug. 2005). (Part 1 of 2, pp. 1-90).

3GPP, "3rd Generation Partnership Project; Technical Specification Group Services and System Aspects; Voice Call Continuity Between CS and IMS Study (Release 7)," 3GPP TR 23.806 V1.4.0 (Aug. 2005). (Part 2 of 2, pp. 91-180).

U.S. Appl. No. 60/690,843 (Jun. 15, 2005).

Strater et al., "Seamless Mobility Between Home Networks and Cable Service," Motorola White Paper (May 27, 2005).

3GPP, "3rd Generation Partnership Project; Universal Mobile Telecommunications System; Mobile Radio Interface Layer 3 Specification, Core Network Protocols—Stage 3," TS 24.008 V3.0.0 (Jul. 1999).

* cited by examiner

SELECTIVE CALL ANCHORING IN A MULTIMEDIA SUBSYSTEM

FIELD OF THE INVENTION

The present invention relates to communications, and in particular to providing a centralized control function for supporting calls over circuit-switched subsystems and packet subsystems as well as selectively anchoring calls in the centralized control function.

BACKGROUND OF THE INVENTION

Packet communications have evolved to a point where voice sessions, or calls, can be supported with essentially the same quality of service as that provided by circuit-switched communications. Packet communications are generally supported over packet subsystems, which were initially supported by local area networks, but are now supported by wireless local area networks (WLANs). Using WLAN access, user elements can support voice sessions using packet communications while moving throughout the WLAN. As such, WLAN access provides users the same freedom of movement within a WLAN as cellular access provides users within a cellular environment.

In many instances, the coverage areas provided by WLANs and cellular networks are complementary. For example, a WLAN may be established within a building complex in which cellular coverage is limited. Given the localized nature of WLAN coverage, cellular networks could bridge the coverage gaps between WLANs. Unfortunately, WLAN access technology is independent of cellular access technology. Cellular networks generally support circuit-switched communications, and WLANs support packet communications. As such, user elements have been developed to support both cellular and WLAN communications using different communication interfaces. With these user elements, users can establish calls via the cellular network and WLAN using the respective communication interfaces. Further, active calls can be transferred back and forth between the cellular network and WLAN.

Call control for calls established through WLANs may be supported by a multimedia subsystem (MS). A MS is generally capable of providing greater multimedia capabilities than a circuit-switched subsystem (CS) of the cellular network. As such, there is movement to provide call control in the MS for calls established over both the CS and MS. Unfortunately, always anchoring call signaling for CS or MS calls in the MS leads to routing inefficiencies and complications. For example, when a CS supporting a user element is a long distance from the MS to which calls are anchored, all calls for the user element must be diverted a long distance through the MS before reaching the remote party. In certain instances, the remote party could be located in the same CS as the user element or in a CS that is a long distance from both the MS and the CS in which the user element is located.

Accordingly, there is a need to dynamically control when calls for a user element are anchored in an MS and when the calls for the user element are directly routed toward a destination without being anchored in the MS.

SUMMARY OF THE INVENTION

The present invention dynamically determines whether call control for a call from a user element should be anchored in a multimedia subsystem (MS) or in a circuit-switched subsystem (CS) based on the location of the user element. Calls may be anchored in the MS regardless of whether the user element is currently served by a cellular network of the CS or a WLAN of the MS. In particular, the anchoring decision is based on whether the user element is within an MS anchoring zone, which defines an area or areas where calls for the user element should be anchored in the MS. Accordingly, when the user element is outside of the MS anchoring zone, calls for the user element are not anchored in the MS. When the user element is within the MS anchoring zone, calls for the user element are anchored in the MS.

When a user element is within an MS anchoring zone, call control for originating and terminating calls in the CS or MS as well as transferring calls between the CS and MS is anchored at a continuity control function (CCF) in the MS. When anchored in the MS, all call signaling for the call is passed through the CCF. The CCF is a service provided in the user element's home MS and may anchor the user element's CS calls and MS calls to provide call control and enable mobility across the CS and MS while maintaining CS calls or MS sessions. Notably, calls and sessions are used interchangeably throughout the specification and claims.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs a Third Party Call Control function to provide call control in the CS. For MS calls, the CCF provides call control by interacting with the user element and a remote endpoint to establish a bearer path directly between the user element and the remote endpoint through the MS.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIG. 9 is a flow diagram illustrating a process for a continuity control function of the multimedia subsystem to make call anchoring decisions for user elements that are initiating outgoing calls, according to one embodiment of the present invention.

DETAILED DESCRIPTION OF THE PREFERRED EMBODIMENTS

Figure 1:
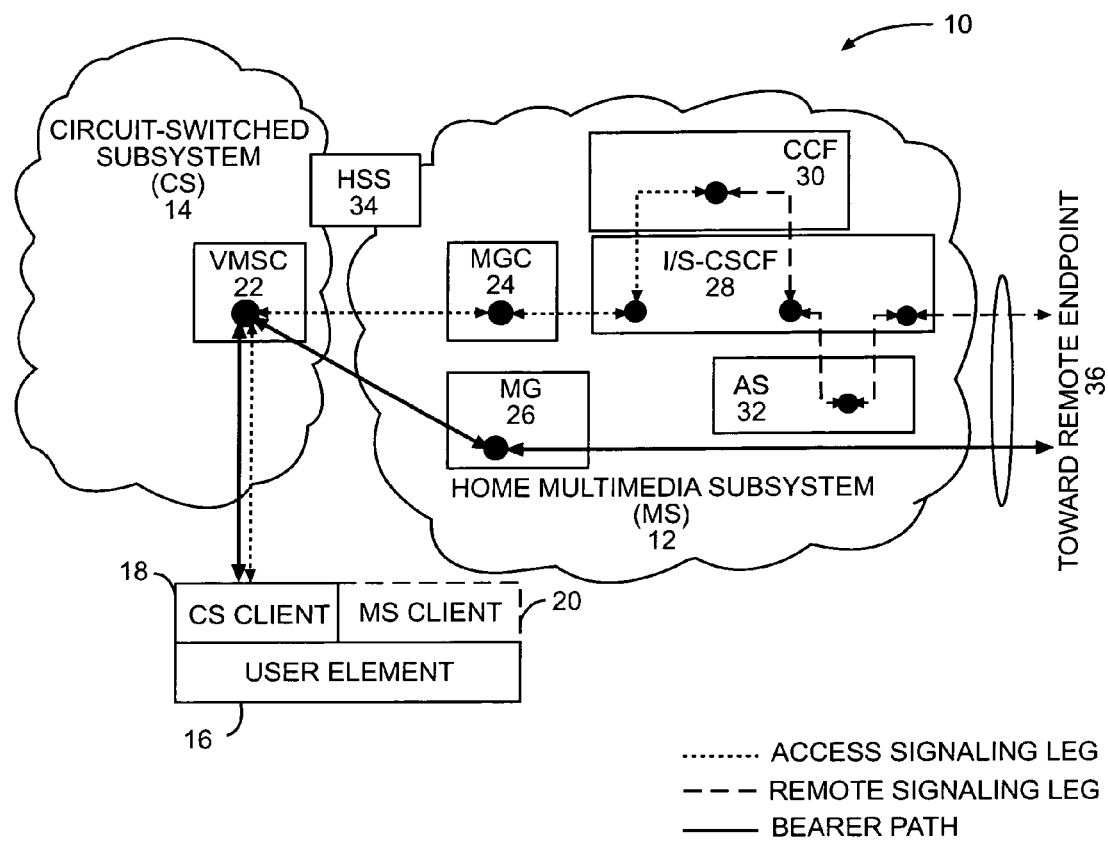
FIG. 1 is a communication environment illustrating circuit-switched subsystem access for a user element according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention dynamically determines whether call control for a call from a user element should be anchored in a multimedia subsystem (MS) or in a circuit-switched subsystem (CS) based on the location of the user element. Calls may be anchored in the MS regardless of whether the user element is currently served by a cellular network of the CS or a WLAN of the MS. In particular, the anchoring decision is based on whether the user element is within an MS anchoring zone, which defines an area or areas where calls for the user element should be anchored in the MS. Accordingly, when the user element is outside of the MS anchoring zone, calls for the user element are not anchored in the MS. When the user element is within the MS anchoring zone, calls for the user element are anchored in the MS.

For clarity and conciseness, a cellular network providing circuit-switched communications is referred to as a CS, and a WLAN providing packet communications is assumed to be part of or associated with the MS, which may be an Internet Protocol (IP) Multimedia Subsystem (IMS). In general, wireless communication techniques having relatively limited range, such as WLAN techniques, are referred to as local wireless communication techniques. Thus, local wireless communication techniques support packet-based communications, wherein cellular communication techniques will generally support circuit-switched communications. Further, the wireless access for local wireless techniques are of a limited range with respect to cellular access techniques.

When a user element is within an MS anchoring zone, call control for originating and terminating calls in the CS or MS as well as transferring calls between the CS and MS is anchored at a continuity control function (CCF) in the MS. When anchored in the MS, all call signaling for the call is passed through the CCF. The CCF is a service provided in the user element's home MS and may anchor the user element's CS calls and MS calls to provide call control and enable mobility across the CS and MS while maintaining CS calls or MS sessions. Notably, calls and sessions are used interchangeably throughout the specification and claims.

For CS calls, the CCF operates to anchor the bearer path for calls originated or terminated through the CS by the user element at a media gateway, which is controlled by a media gateway controller of the home MS. Although the media gateway belongs to the home MS, the media gateway is preferably located in close proximity to the CS to save backhaul costs. In one embodiment, the CCF employs a Third Party Call Control function to provide call control in the CS. For MS calls, the CCF provides call control by interacting with the user element and a remote endpoint to establish a bearer path directly between the user element and the remote endpoint through the MS.

The CCF is addressable using public service identities (PSI). In the CS, a directory number associated with the CCF is used for routing call signaling messages within the CS. In the MS, a uniform resource location (URL) associated with the CCF is used for routing call signaling messages within the MS. In the following description, 3GPP TS 24.008 (DTAP) is used in the CS, while the Session Initiation Protocol (SIP) is used in the MS to effect origination, termination, and transfer of calls. Those skilled in the art will recognize other applicable and useful protocols as substitutes for DTAP and SIP.

Prior to delving into the details of making anchoring decisions and defining the MS anchoring zone or zones, an overview of anchoring both CS based calls and MS based calls in the MS is provided. After describing the anchoring of calls in the MS, details for selectively employing MS anchoring and defining the MS anchoring zone or zones are provided.

Turning now to FIG. 1, a communication environment 10 is illustrated wherein a call is anchored in a home MS 12 while a CS 14 is currently serving a roaming user element 16. In the communication environment 10, the home MS 12 and the visited CS 14 may support communications for the user element 16 depending on the location of the user element 16. The user element 16 includes a CS client 18 and an MS client 20, which are configured to support circuit-switched communications via the CS 14 as well as packet communications via the MS 12, respectively. For communications within the CS 14, a visited mobile switching center (VMSC) 22 will support circuit-switched communications for the user element 16. The VMSC 22 may interact with the home MS 12 via a media gateway controller (MGC) 24 and an associated media gateway (MG) 26, both of which are affiliated with the MS 12.

The home MS 12 may include various functions or entities, including an interrogating and serving call/session control function (I/S-CSCF) 28, a CCF 30, an application server (AS) 32, and a home subscriber service (HSS) 34. Notably, the interrogating CSCF provides the standard I-CSCF functions and the serving CSCF provides standard S-CSCF functions. These functions are represented in the I/S-CSCF 28 for conciseness. Further, the HSS 34 may have a presence in both the CS 14 and the MS 12. The HSS 34 may include a home location resource component in a home CS. Call/session control functions (CSCFs) in the home MS 12 generally act as SIP proxies and provide various functions in association with call control, as will be appreciated by those skilled in the art. In operation, an interrogating CSCF (I-CSCF) may interact with the HSS 34 to identify the serving CSCF (S-CSCF), which will be assigned to support a given user element. For the present invention, the HSS 34 may maintain an association between a user element 16 and a particular CCF 30 that is assigned to the user element 16. As such, the HSS 34 will assist in identifying a serving CSCF for the user element 16, as well as keep an association between a particular CCF 30 and the user element 16. The CCF PSI for the user element 16 may be provisioned in the user element 16 to enable the user element 16 to initiate transfers and the like controlled by the CCF 30. Alternatively, the CCF PSI may be transferred to the user element 16 upon network registration.

Depending on whether the user element 16 is currently registered in the MS 12, different techniques may be used to access the MS 12. When the user element 16 is registered in the MS network 12, the user element 16 will have an S-CSCF assigned to it, and will use that S-CSCF to access the CCF 30. When the user element 16 is not currently registered in the MS network 12, a temporary S-CSCF may be assigned to the user element 16, and the temporary S-CSCF will be used to access the CCF 30.

The application servers 32 may be invoked and placed within the call signaling path to implement any number of features or services. When a particular application service provided by an application server 32 is invoked, all signaling for the associated call or session is passed through the application service, which has the opportunity to process call signaling messages as necessary to implement the desired service. Notably, the CCF 30 acts like a service, and as such, the I/S-CSCF 28 will operate to pass all call signaling messages for the call through the CCF 30, thereby allowing the CCF 30 to act as an anchor for the call when the user element is within the MS anchoring zone.

In FIG. 1, assume the user element 16 is within the MS anchoring zone and engaged in a call that is supported by the CS client 18 and controlled by the CCF 30. As such, call signaling for the call passes through the VMSC 22, media gateway controller 24, I/S-CSCF 28, CCF 30, and perhaps application server 32, if a service is invoked, on its way toward a remote endpoint 36. Notably, the access signaling leg, which is provided by the CS 14, is anchored at the CCF 30 and extends through the I/S-CSCF 28, media gateway controller 24, the VMSC 22, and CS client 18 of the user element 16. The remote signaling leg toward the remote endpoint 36 is anchored in the CCF 30 and extends through the I/S-CSCF 28 and the application server 32. In this configuration, the CCF 30 can maintain control of the call and provide any necessary call processing during the call. Further, if a call transfer is required, the CCF 30 maintains the remote signaling leg and establishes a new access signaling leg.

The bearer path for the call illustrated in FIG. 1 extends from the CS client 18 through the VMSC 22 and media gateway 26 on its way toward the remote endpoint 36. Notably, the media gateway controller 24 cooperates with the media gateway 26, such that a circuit-switched connection may be established between the media gateway 26 and the CS client 18 via the VMSC 22. The packet session may be established for the call from the media gateway 26 through the home MS 12 toward the remote endpoint 36.

Figure 2:
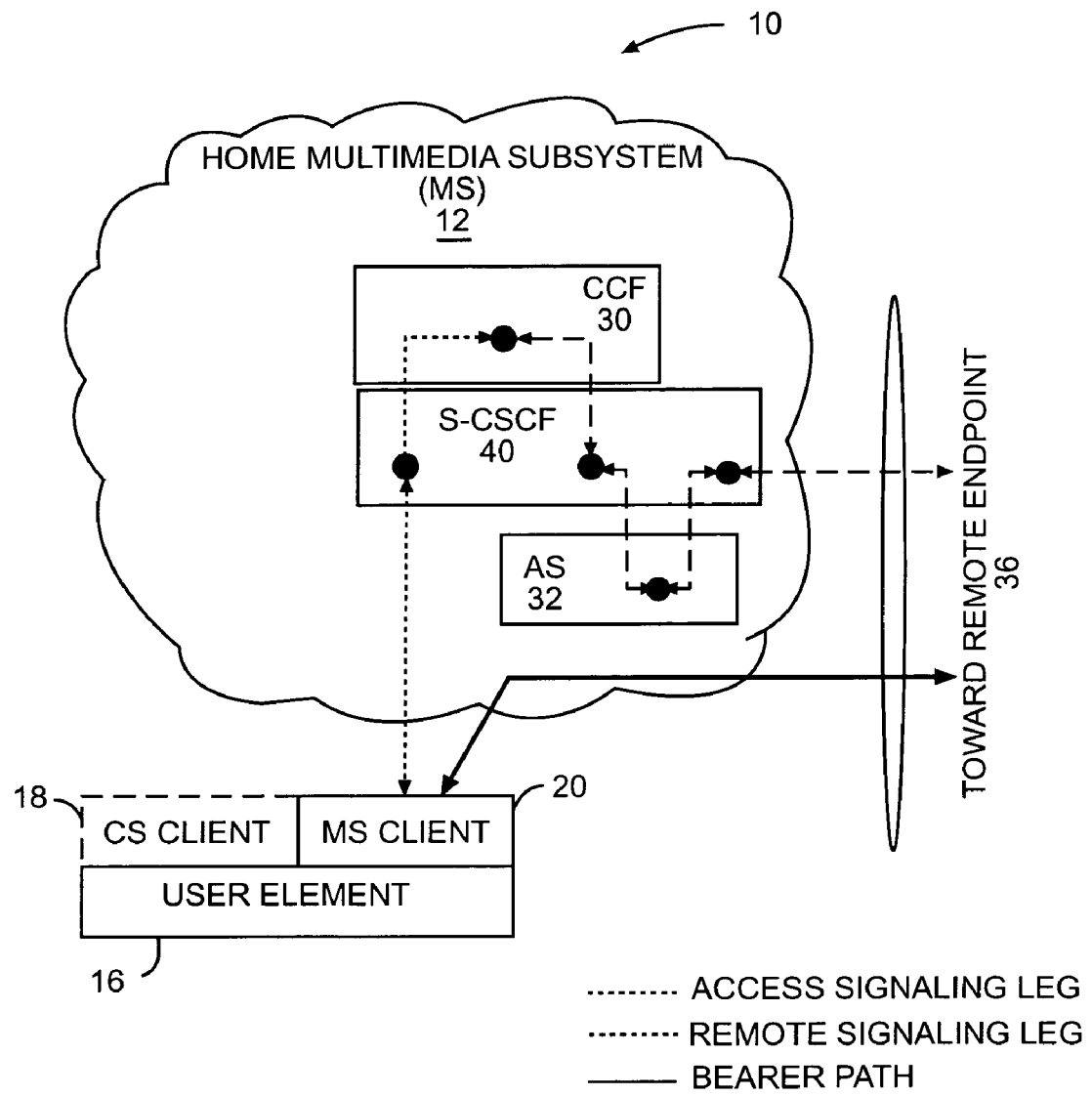
FIG. 2 is a communication environment illustrating multimedia subsystem access for a user element according to one embodiment of the present invention.

With reference to FIG. 2, a call supported by the MS client 20 of the user element 16 is represented. Further, the user element 16 is within an MS anchoring zone. In this scenario, the call does not extend through the CS 14, and will not employ the services of the VMSC 22, media gateway controller 24, or media gateway 26. Instead, the MS client 20 will support call signaling directly with the MS 12, and in particular with the CCF 30 via a serving-CSCF (S-CSCF) 40. Notably, the I/S-CSCF 28 and the S-CSCF 40 may represent the same CSCF or different CSCFs, depending on how the user element 16 registers with the MS 12.

As illustrated, call signaling is anchored in the CCF 30, wherein an access signaling leg is provided between the CCF 30 and the MS client 20 via the S-CSCF 40. A remote signaling leg is supported between the remote endpoint 36 and the CCF 30 via the S-CSCF 40 and any desired application servers 32 that may provide additional services in association with the call. The bearer path will extend from the MS client 20 toward the remote endpoint 36 via the MS 12, without traveling through the CS 14 (FIG. 1). Again, the CCF 30 anchors the call, such that a transfer is required, the remote signaling leg toward the remote endpoint 36 can be maintained, while the access signaling leg may be changed to facilitate the transfer from the home MS 12 to the CS 14. For transfer of calls between the CS 14 and the MS 12, the access signaling legs illustrated in FIGS. 1 and 2 will be changed to support the transfer, while the remote signaling leg is maintained by the CCF 30.

Subsystem transfers enable the user element 16 to move between the CS 14 and the MS 12 while maintaining one or more active calls (voice sessions). Call transfers associated with a given call, including initial and subsequent transfers, are executed and controlled in the home MS 12 by the CCF 30, upon a request received from the user element 16. To enable such transfers, the CCF 30 is inserted into the signaling path of the calls by an S-CSCF (28 or 40). To anchor the signaling path, the CCF 30 will employ a back-to-back user agent function (B2BUA), which may operate as follows. When the user element 16 originates a call, the CCF 30 will terminate an access signaling leg from the user element 16 and establish a remote signaling leg toward the remote endpoint 36. When terminating a call at the user element 16, the CCF 30 will terminate a remote signaling leg from the remote endpoint 36 and establish an access signaling leg toward the user element 16. Subsequently, the CCF 30 will coordinate call signaling between the access signaling leg and the remote signaling leg for the call.

When the user element 16 is originating a call, the CCF 30 appears as a service provided by an application server, such as the application server 32. In one embodiment, the CCF 30 is invoked as the first service in a chain of services. When the user element 16 is terminating a call, the CCF 30 is invoked as the last service in a chain of services. By locating the CCF 30 with respect to the other services in this manner, other applications associated with the call are anchored by the CCF 30 as part of the remote signaling leg of the call, and are therefore not impacted by transfers affecting the access signaling leg.

In one embodiment of the present invention, a Mobile Subscriber Integrated Services Digital Network number (MSISDN) or other user element identifier is owned and controlled by the MS 12 to enable anchoring of incoming calls intended for the user element 16 at the CCF 30. Incoming calls destined for the user element 16 and originated from the CS 14, the public switched telephone network (PSTN), or other MS can be anchored at the CCF 30 by setting up routing functions at the originating service nodes, such that incoming calls intended for the user element 16 are delivered to the home MS 12. As such, the CCF 30 can take the necessary steps to find the user element 16 and route the call to the user element 16, even if the user element 16 is in the CS 14 when the call arrives.

As indicated, the HSS 34 may store filter criteria associated with the CCF 30 as part of the user element's subscription profile. The CCF filter criteria is downloaded to the currently assigned S-CSCF (28 or 40) as part of the initial filter criteria to use when the user element 16 registers with the MS 12. This filter criteria is generally executed at the S-CSCF 40 (or 28) upon initiation of a call or session from the user element 16 or upon receipt of an incoming session intended for the user element 16. This filter criteria will instruct the S-CSCF 40 (or 28) to invoke the CCF 30 to control at least the bearer path for the call or session.

Figure 3:
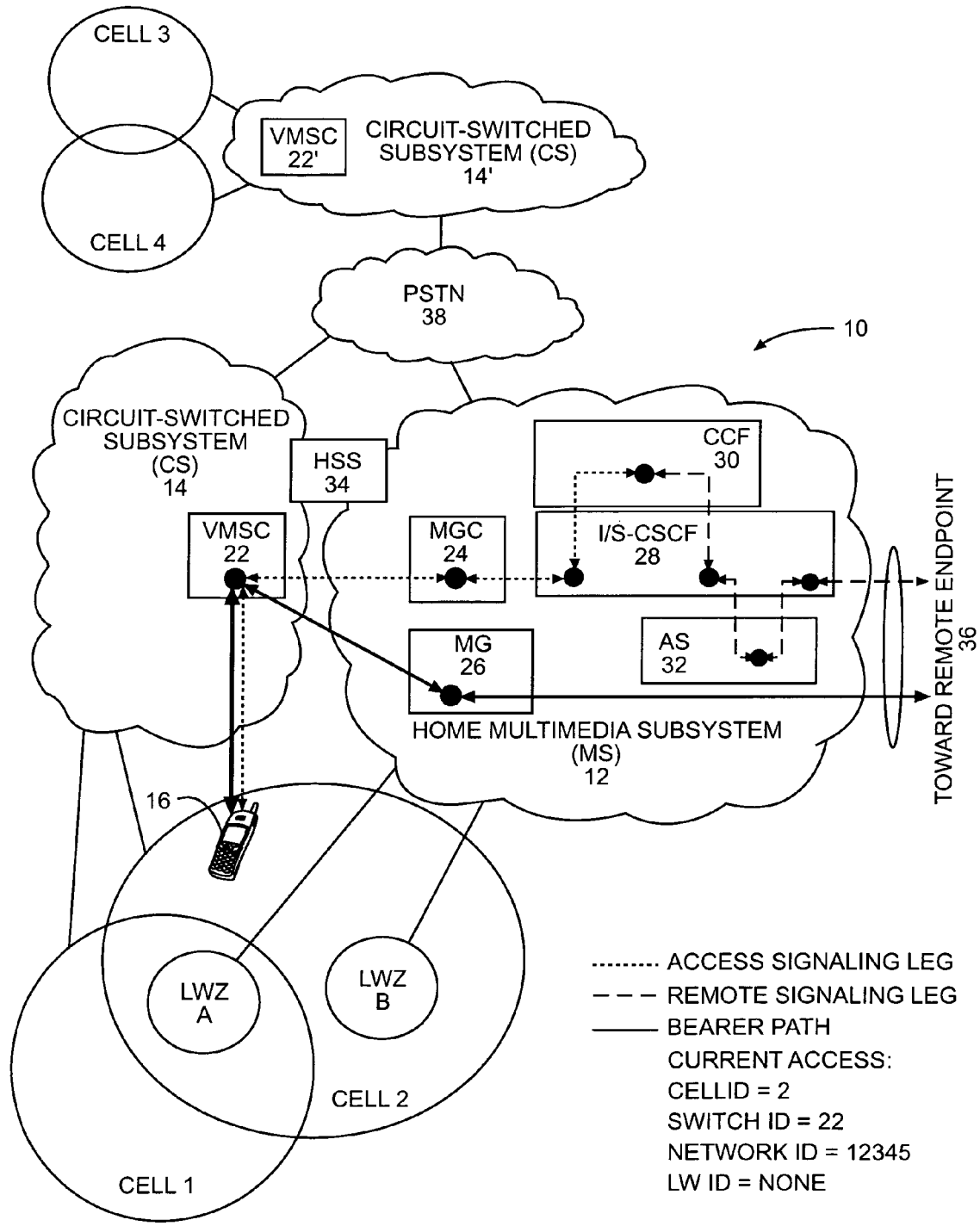
FIG. 3 is a communication environment illustrating local circuit-switched subsystem access for a user element when call anchoring in the multimedia subsystem is employed according to one embodiment of the present invention.

With reference to FIG. 3, the scope of the communication environment 10 provided in FIG. 1 is expanded. In particular, the CS 14 is shown as being associated with two cellular network cells CELL 1 and CELL 2. The MS 12 is shown with associated local wireless zones LWZ A and LWZ B. Notably, cells 1 and 2 partially overlap one another. Local wireless zone A is located within the area in which cells 1 and 2 overlap one another, while local wireless zone B is contained within cell 2 but not within cell 1. Additionally, a public switched telephone network (PSTN) 38 is also associated with the MS 12 and the CS 14. The PSTN 38 supports an additional CS 14', which is associated with cells 3 and 4. The CS 14' may include a VMSC 22'.

In this example, assume that an MS anchoring zone is defined to include all or most of the cells supported by the CS 14 and the local wireless zones supported by the MS 12. The MS anchoring zone is defined to include cell 1 and cell 2 of the CS 14, the local wireless zones A and B, and the provider network having the network ID of 12345. The CS 14' and the associated cells 3 and 4 are not considered within the MS anchoring zone. Notably, local wireless zones A and B do not need to reside within cells 1 and 2 to be part of the MS anchoring zone. There are numerous ways to determine whether or not the user element 16 is within the MS anchoring zone. For example, the MS anchoring zone may be tied to a specific geographic area, wherein the geographic location of the user element 16 may be analyzed to determine whether the user element 16 is within the MS anchoring zone. As illustrated, the MS anchoring zone is generally defined as being service areas for one or more cells (1 or 2), local wireless zones (A or B), or provider networks. These entities will be associated with IDs, wherein the user element 16 may recognize cell IDs, switch (VMSC) IDs, network IDs, local wireless zone IDs, and the like, and determine whether being served by one of these entities correlates to being within the MS anchoring zone.

As illustrated, the user element 16 is being served by cell 2 of CS 14, which is associated with a provider network having a network ID of 12345. Accordingly, the user element's current access profile is as follows: cell ID=2; switch ID=22; network ID=12345; local wireless ID=none. If the MS anchoring zone is defined to include any one or a combination of these IDs, the user element 16 is considered within the MS anchoring zone. Since the user element 16 is within the MS anchoring zone, calls for the user element 16 are anchored in the CCF 30 of the MS 12.

Figure 4:
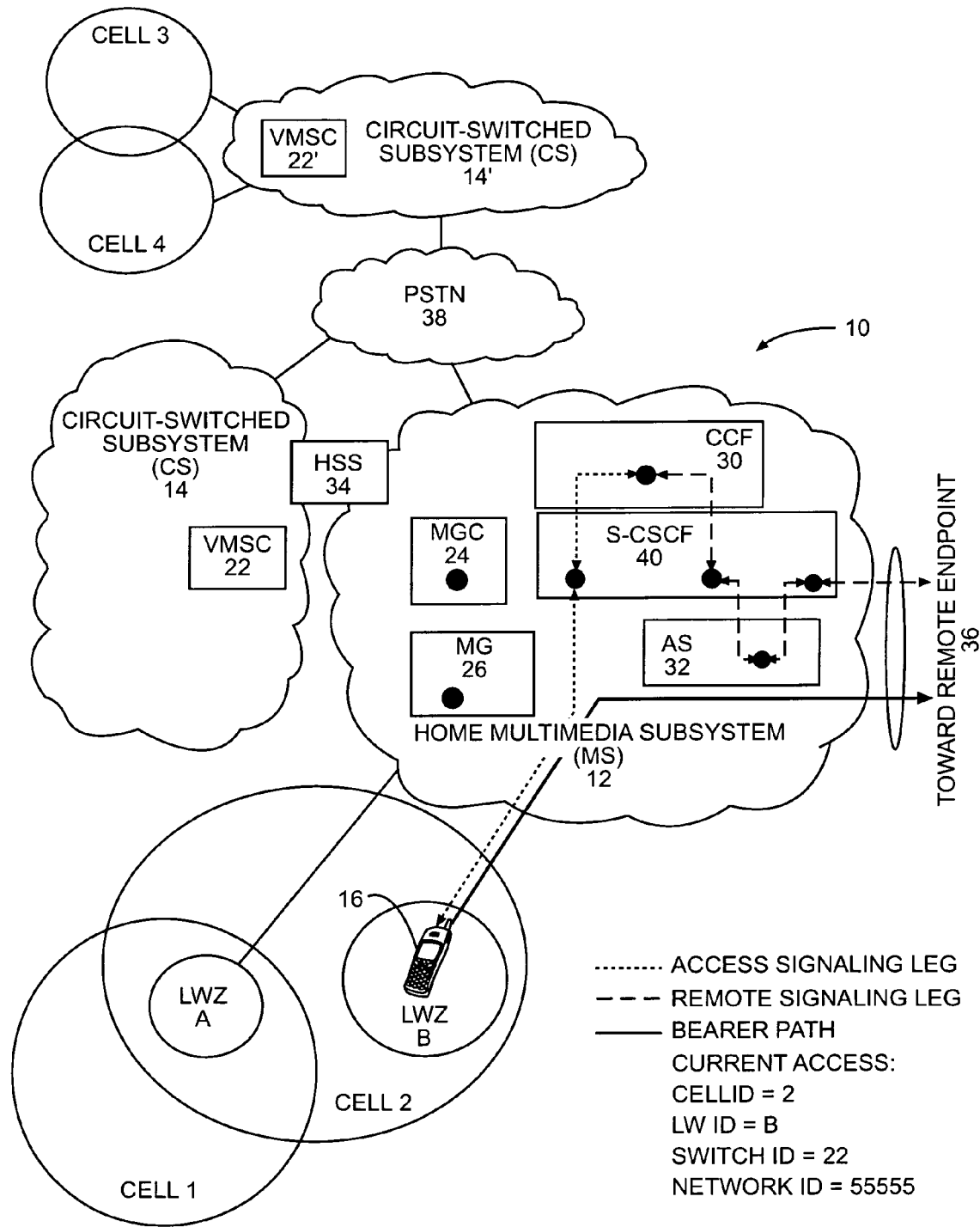
FIG. 4 is a communication environment illustrating local multimedia subsystem access for a user element when call anchoring in, the multimedia subsystem is employed according to one embodiment of the present invention.

With reference to FIG. 4, the user element 16 is within local wireless zone B, which is within cell 2. As such, calls may be supported using cellular techniques through the CS client 18 or local wireless techniques through the MS client 20. Determining whether to user the CS client 18 or the MS client 20 for an incoming or outgoing call is beyond the scope of the present invention. With regard to anchoring calls when the user element 16 is within local wireless zone B, a determination is made to anchor calls at the CCF 30 of the MS 12, because the user element 16 is within the MS anchoring zone, which was defined above. The current access profile for the user element 16 is as follows: cell ID=2; local wireless ID=B; switch ID=22; network ID=55555. As such, the local wireless network provider associated with the network ID 55555 is part of the MS anchoring zone definition. Since the user element 16 is within the MS anchoring zone, calls are anchored at the CCF 30 of the MS 12, even though communications are supported via the MS client 20 of the user element 16 and the resulting call is routed through the MS 12 instead of the CS 14.

Figure 5:
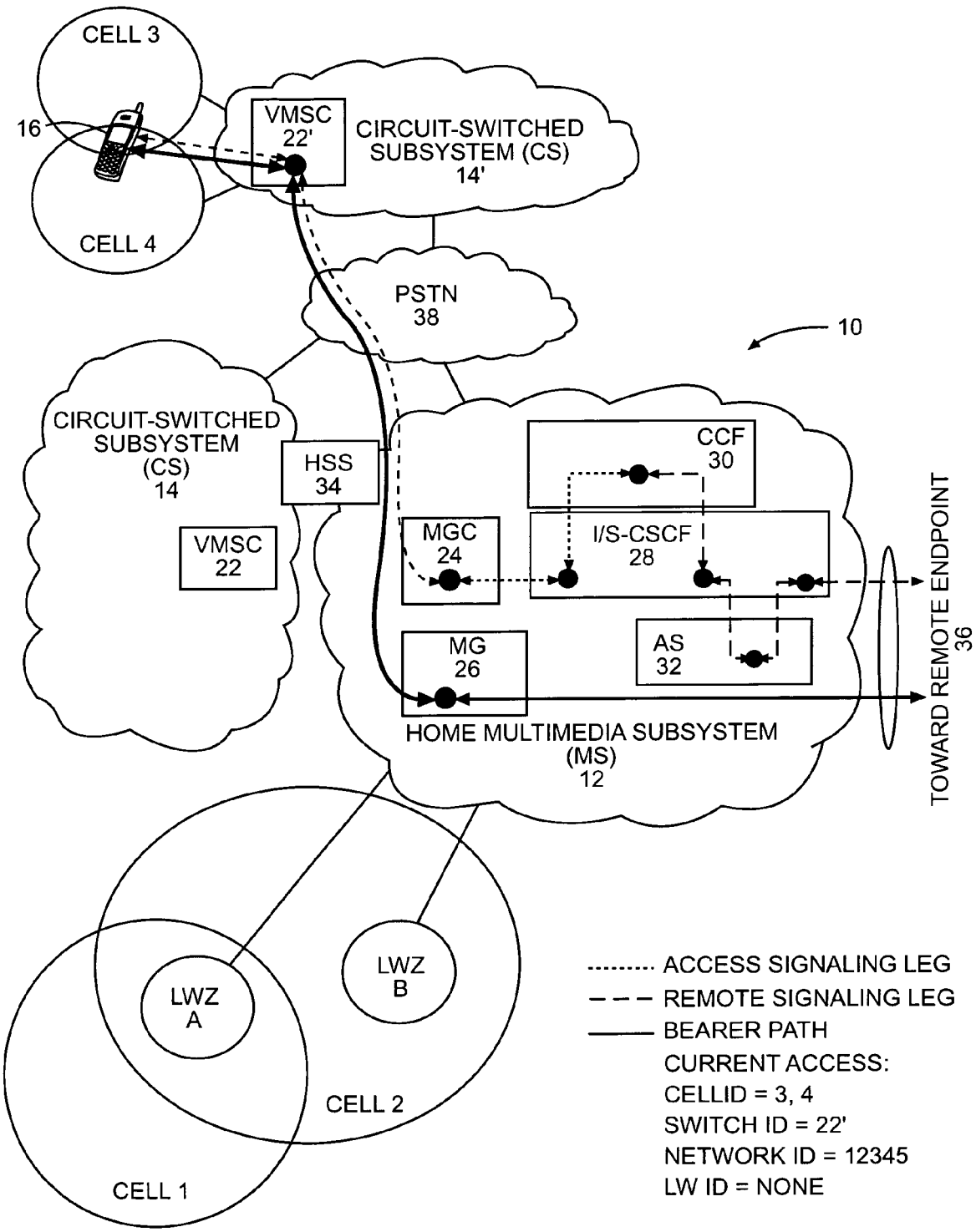
FIG. 5 is a communication environment illustrating remote circuit-switched subsystem access for a user element when call anchoring in the multimedia subsystem is employed according to one embodiment of the present invention.

Turning now to FIG. 5, assume the user element 16 moves to an area where communication access is provided via the VMSC 22' of the CS 14', and in particular, the user element 16 is in an area where cells 3 and 4 overlap. As illustrated, calls are anchored at the CCF 30 in the MS 12. Such anchoring would take place if the MS anchoring zone included cells 3 or 4, the VMSC 22', or the CS 14' as part of the MS anchoring zone definition. Alternatively, calls would be anchored at the CCF 30 of the MS 12 if all calls were required to be anchored at the CCF 30 of the MS 12, or if dynamic anchoring of the present invention was not employed. The current communication access profile is as follows: cell ID=3,4; switch ID=22'; network ID=12345; local wireless ID=none.

Figure 6:
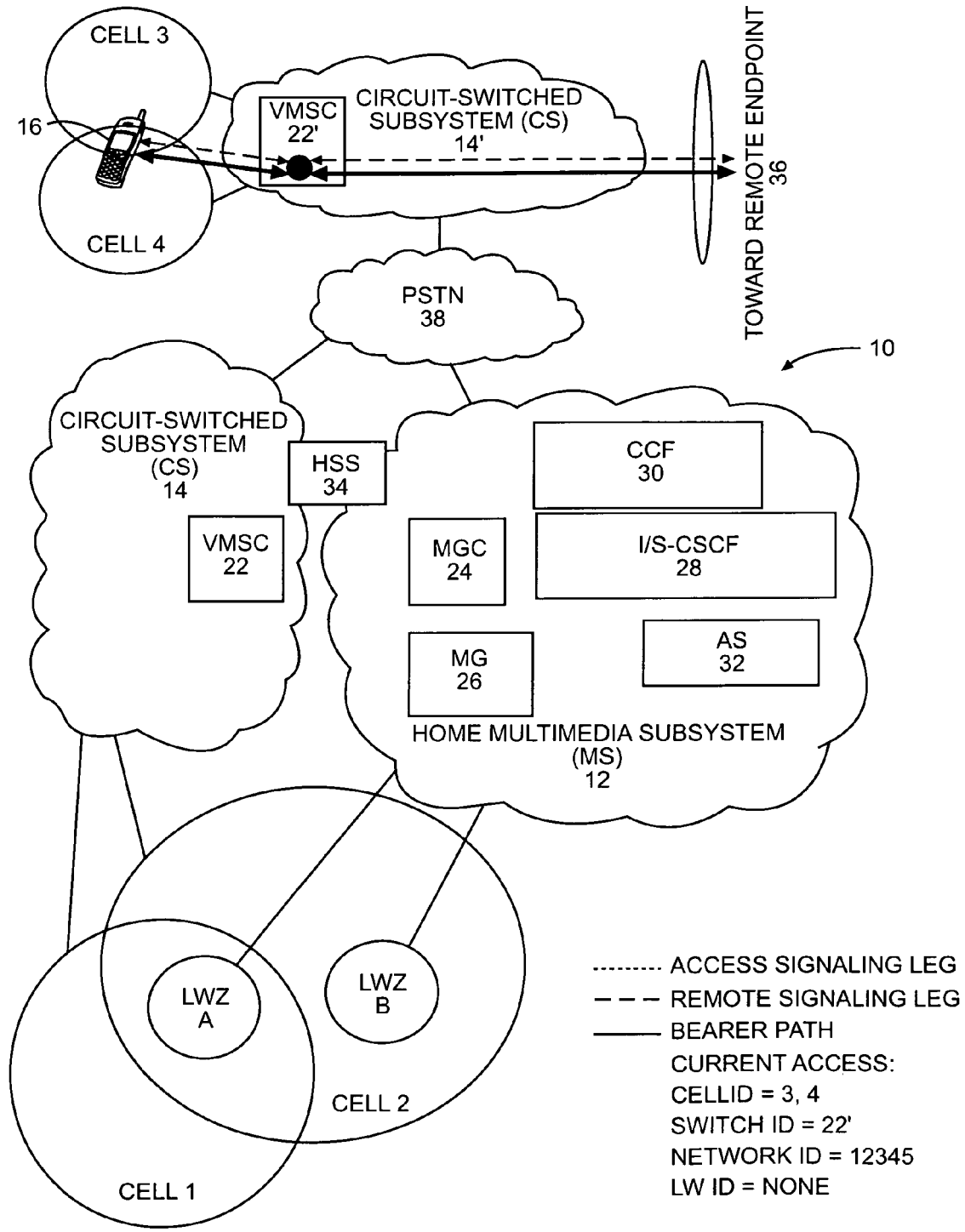
FIG. 6 is a communication environment illustrating remote circuit-switched subsystem access for a user element when call anchoring in the multimedia subsystem is not employed according to one embodiment of the present invention.

Turning now to FIG. 6, assume user element 16 is in the same location as that illustrated in FIG. 5, and therefore the current communication access profile is the same as that of FIG. 5. However, assume that the MS anchoring zone does not include the current location of the user element 16, and as such, cells 3 and 4, the VMSC 22', or the CS 14', are not considered within the MS anchoring zone. When selective anchoring is employed, calls will not be anchored at the CCF 30 of the MS 12 when the user element 16 is outside of the MS anchoring zone. Instead, the calls are routed directly between the user element 16 and the remote endpoint 36 without routing the call through the MS 12 or invoking the CCF 30 to play a role in controlling the call signaling associated with the call.

From the above, the present invention functions to determine whether a user element 16 is within an MS anchoring zone. If the user element 16 is within the MS anchoring zone, calls are anchored at the CCF 30 of the MS 12. If the user element 16 is outside of the MS anchoring zone, calls are routed directly to or from a remote endpoint 36 without invoking the MS 12, and in particular, the home MS 12 associated with the user element 16. The MS anchoring zone is defined to meet the desired communication efficiencies of the communication provider and reduce or minimize inefficient routing of calls through the home MS 12 of the user element 16 when the user element 16 is too far from the MS 12 or currently served by a network where such anchoring is undesirable.

Figure 7:
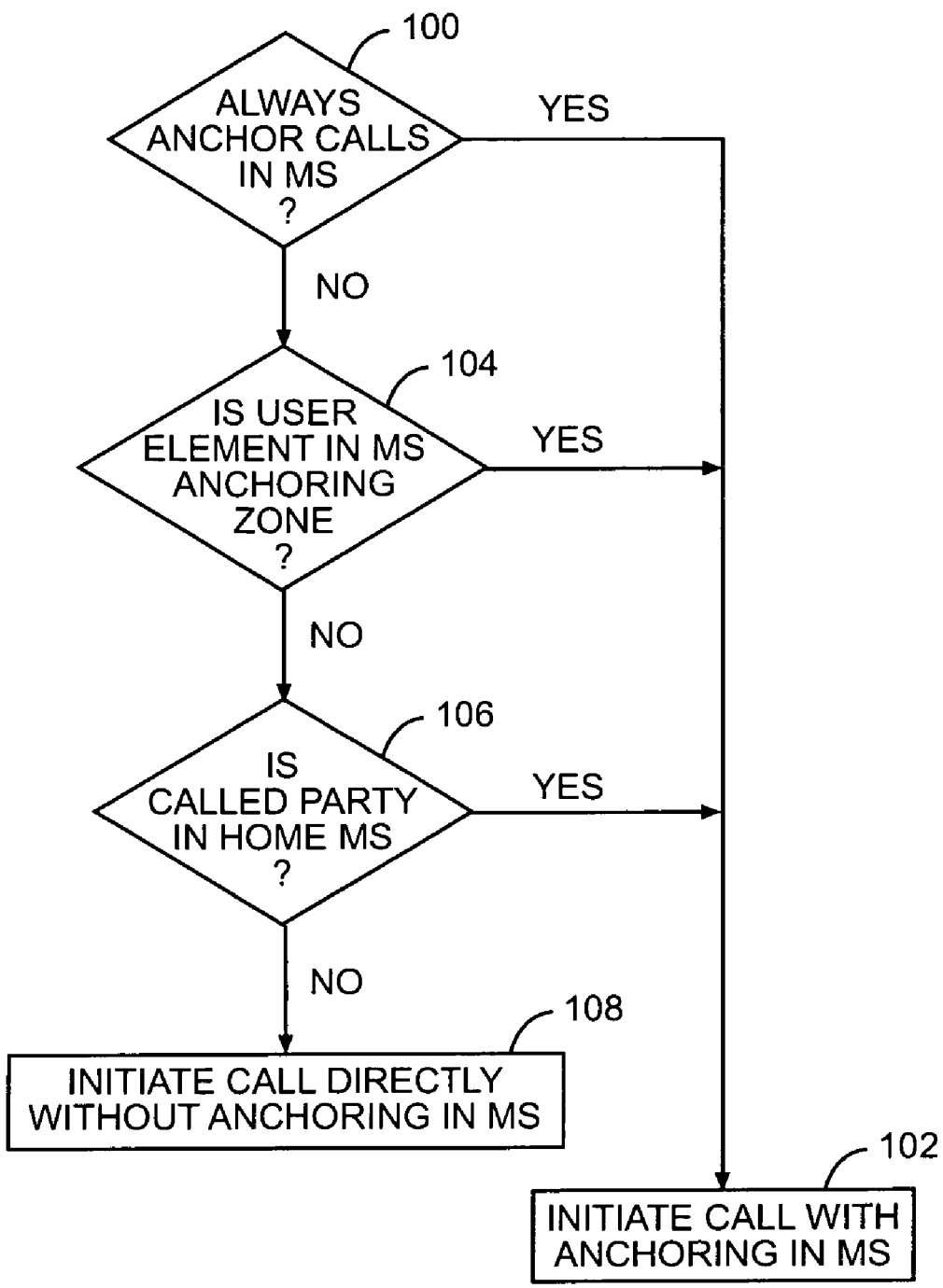
FIG. 7 is a flow diagram illustrating a process for user elements to make call anchoring decisions and initiate outgoing calls according to one embodiment of the present invention.

Determining whether a user element 16 is within an MS anchoring zone and deciding whether to anchor the call in the MS 12 may be provided in the user element 16 or in the MS 12. FIG. 7 is a flow diagram where a user element 16 operates to determine where to anchor an outgoing call. Initially, the user element 16 may determine whether or not all calls should be anchored in the MS 12 (step 100). If all calls should be anchored in the MS 12, the user element 16 may initiate a call with anchoring in the MS 12 (step 102). The details of initiating a call where the call is anchored in the MS 12 are provided further below.

If dynamic anchoring is employed, the user element 16 will determine whether it is in the MS anchoring zone (step 104). If the user element 16 is within the MS anchoring zone, the user element 16 will initiate a call to be anchored in the MS 12 (step 102). If the user element 16 is not within the MS anchoring zone (step 104), the user element 16 may determine whether the called party is in the home MS 12 (step 106). If the called party is within the home MS 12, the user element 16 may initiate a call to be anchored in the MS 12 (step 102). In this scenario, although the user element 16 is not within the MS anchoring zone, the fact that the called party is serviced by the home MS 12 is sufficient to warrant routing the call through the home MS 12, because routing the call otherwise would not necessarily provide more efficient call routing.

If the user element 16 is not within the MS anchoring zone (step 104) and the called party is not within the user element's home MS 12 (step 106), the user element 16 may initiate the call directly without employing anchoring in the MS 12 (step 108). If the user element 16 is within a remote CS 14', the call may be simply initiated and anchored within the remote CS 14'. If the user element 16 is supported by a remote MS (not illustrated), the call may be initiated and anchored in the remote MS.

Figure 8:
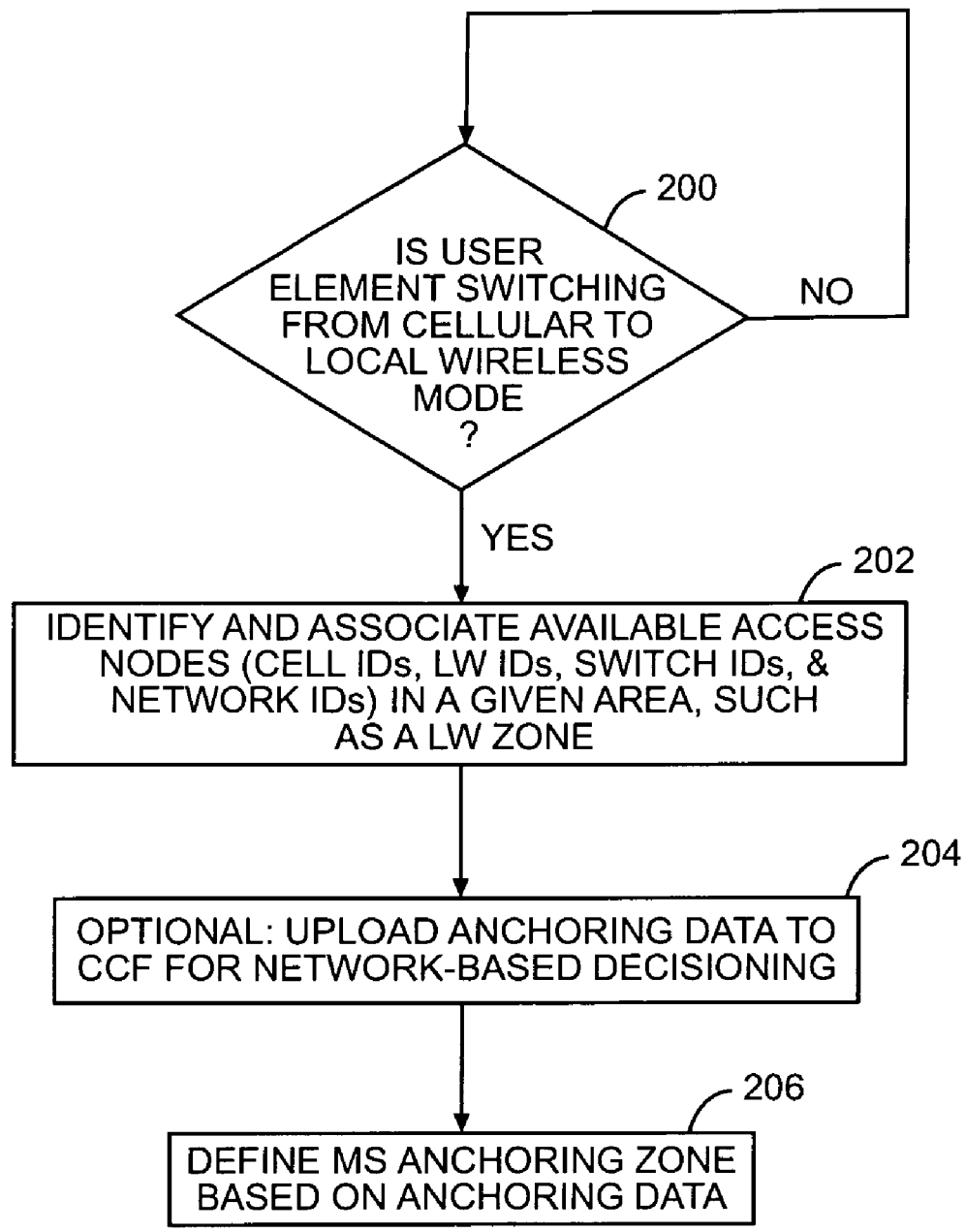
FIG. 8 is a flow diagram illustrating a process for user elements to update and define anchoring zones, which control call anchoring decisions, according to one embodiment of the present invention.

With reference to FIG. 8, a flow diagram is provided for identifying and potentially defining an MS anchoring zone. This process could be provided solely in the user element 16 or in the MS 12 with the assistance of the user element 16. In other embodiments, the MS anchoring zone may be defined without involvement by the user element 16. The process begins when an active user element 16 is switching from a cellular to a local wireless access mode (step 200). When the user element 16 is switching from a cellular to a wireless access mode or vice versa, the user element 16 may identify and associate with available access nodes in a given area to effectively recognize a communication profile (step 202). The access nodes may correspond to the base stations or access points associated with cells and local wireless zones, supporting switches, or recognizable service providers. As such, the user element 16 will be able to identify cell IDs, local wireless IDs, switch IDs, network IDs, and the like in a given area, such as a local wireless zone. The ability to communicate with the various access nodes or receive service from a given service provider can be used to develop a communication signature, which corresponds to anchoring data.

In one embodiment, the user element 16 may upload the anchoring data to the CCF 30 for network-based decisioning (step 204). As such, the CCF 30 may look at the anchoring data for a given area to help determine and define an MS anchoring zone based on the current anchoring data and previously received anchoring data (step 206). In addition or as an alternative, the user element 16 may process the anchoring data to define the MS anchoring zone, and as such, the CCF 30 need not be responsible for defining the MS anchoring zone or making the decision as to whether the user element 16 is within the MS anchoring zone. Those skilled in the art will recognize that defining an MS anchoring zone and making the decision as to whether the user element 16 is within the MS anchoring zone may be provided in the user element 16 or in various nodes within the MS 12.

Figure 9:
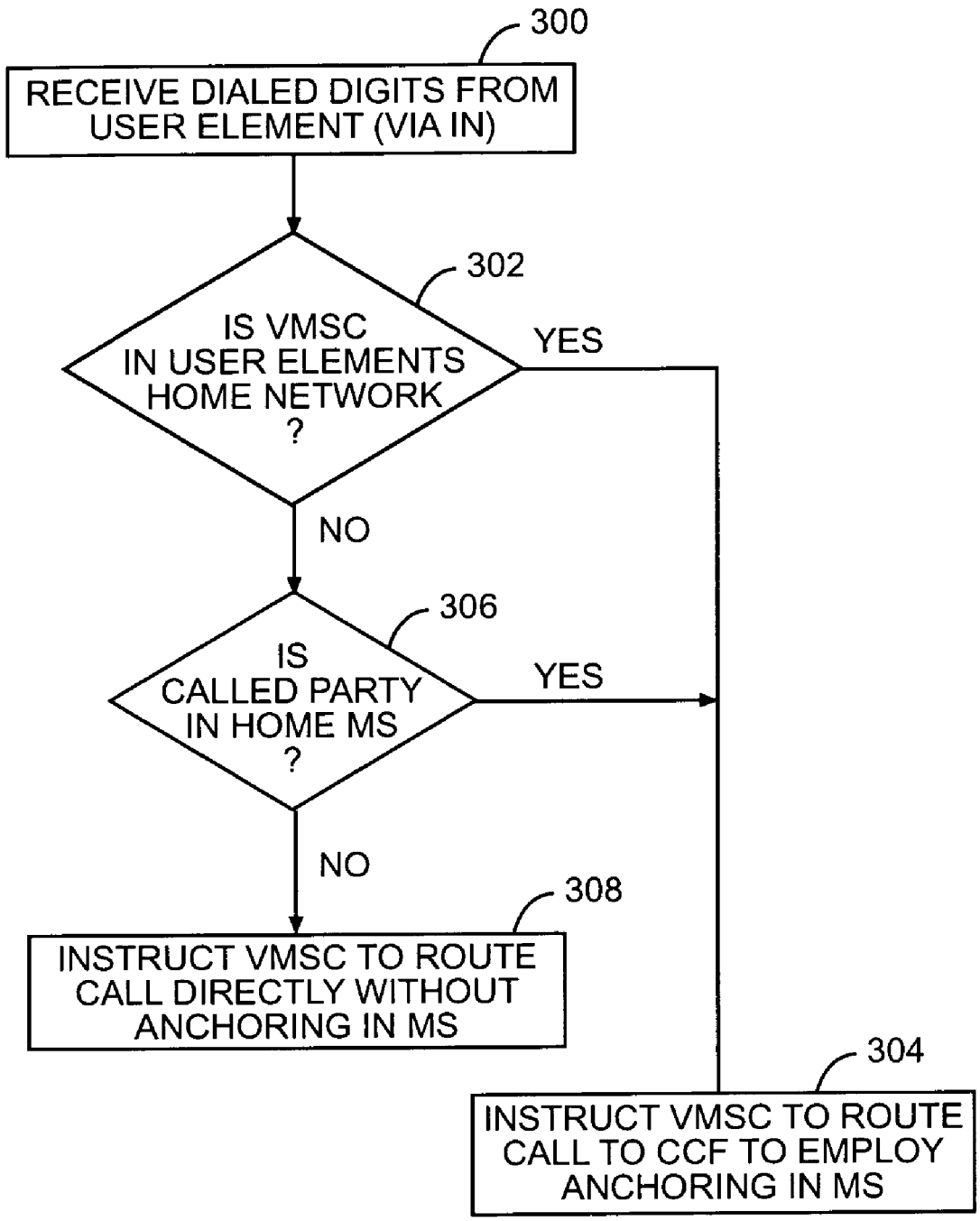
FIG. 9 is a flow diagram illustrating a process for a continuity control function of the multimedia subsystem to make call anchoring decisions for mobile switching centers, which are supporting user elements that are initiating outgoing calls according to one embodiment of the present invention.
Figure 10:
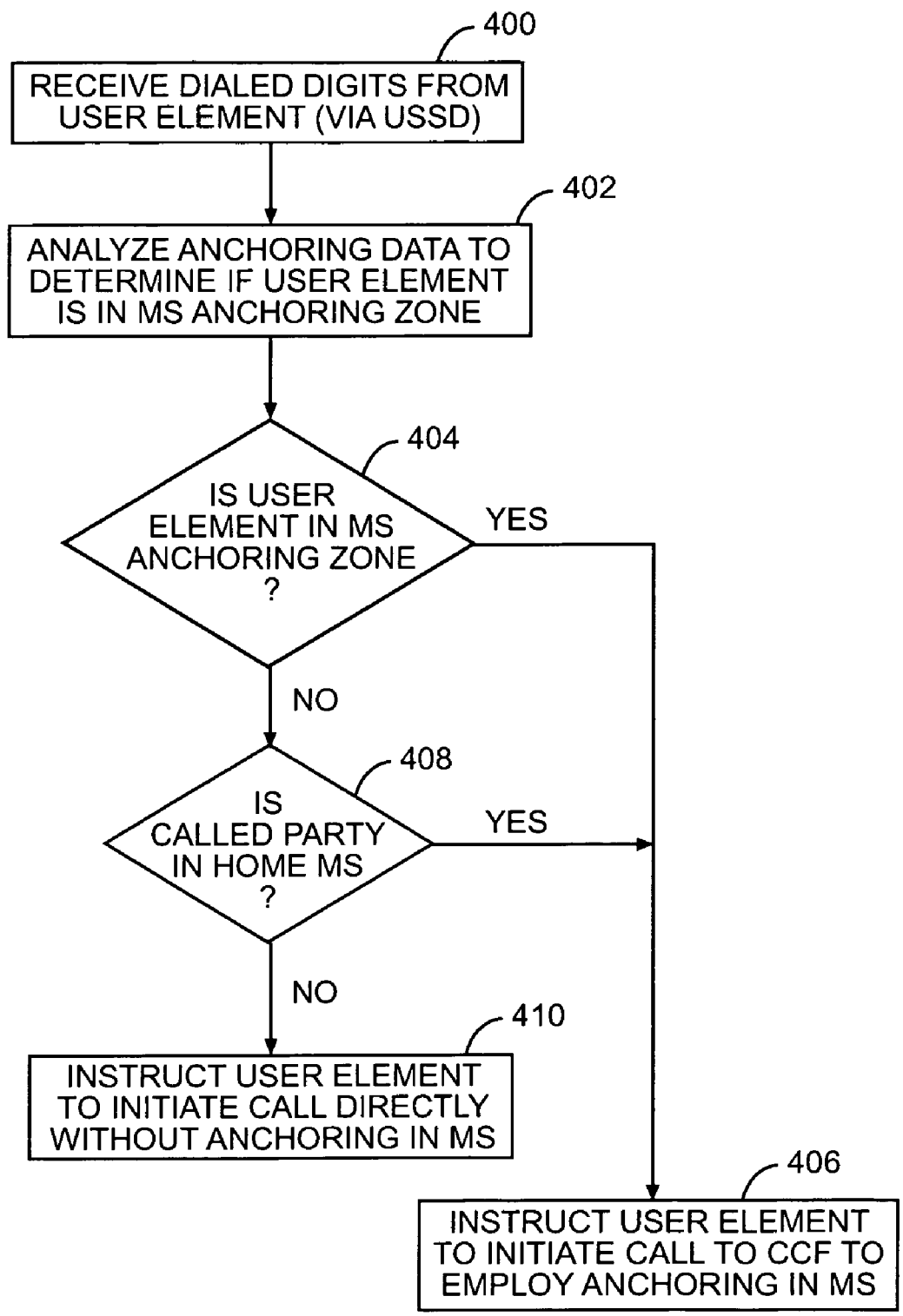

FIGS. 9 and 10 provide flow diagrams where the CCF 30 in the MS 12 determines whether calls being initiated from the user element 16 should be anchored at the CCF 30 in the MS 12. In FIG. 9, the CCF 30 will instruct the serving VMSC 22 to route the call to the CCF 30 for anchoring in the MS 12. In FIG. 10, the CCF 30 provides directions directly to the user element 16, which will respond by initiating the call to the CCF 30, such that the call can be anchored within the MS 12.

With particular reference to FIG. 9, the CCF 30 will receive the dialed digits from the user element 16 via any number of intelligent networking (IN) elements, such as the VMSC 22 (step 300). The CCF 30 will determine whether the VMSC 22 is in the user element's home network, such as the CS 14 (step 302). If the VMSC 22 currently serving the user element 16 is within the CS 14, the CCF 30 will instruct the VMSC 22 to route the call to the CCF 30 to employ anchoring in the MS 12 (step 304). In this case, the MS anchoring zone is at least the cellular coverage area supported by the VMSC 22.

If the VMSC 22 currently serving the user element 16 is not within the home network of the user element 16 (step 302), the CCF 30 will determine whether the called party is within the home MS 12 for the user element 16 (step 306). If the called party is within the home MS 12 of the user element 16, the CCF 30 will instruct the VMSC 22 to route the call to the CCF 30 to employ anchoring in the MS 12 (step 304). If the VMSC 22 serving the user element 16 is not within the home network of the user element 16 (step 302), and the called party is not within the home MS 12 of the user element 16 (step 306), the CCF 30 will instruct the VMSC 22 to route the call directly toward the endpoint 36 without employing anchoring in the MS 12 (step 308).

With particular reference to FIG. 10, the CCF 30 will instruct the user element 16 to take the necessary action to invoke anchoring in the MS 12, when such anchoring is desired. Initially, the CCF 30 will ultimately received the dialed digits and current anchoring data from the user element 16 (step 400). This information may be provided using Unstructured Supplementary Service Data (USSD) messaging techniques. The CCF 30 will analyze the anchoring data to determine if the user element 16 is within the MS anchoring zone (step 402). If the user element is within the MS anchoring zone (step 404), the CCF 30 will instruct the user element to initiate a call to the CCF 30 to effectively employ anchoring in the MS 12 (step 406).

If the user element 16 is not within the MS anchoring zone (step 404), the CCF 30 will determine whether the called party is in the home MS 12 of the user element 16 (step 408). If the called party is in the home MS 12 of the user element 16, the CCF 30 will instruct the user element 16 to initiate a call to the CCF 30 to employ anchoring in the MS 12 (step 406). If the called party is not within the home MS 12 of the user element 16 (step 408), the CCF 30 will instruct the user element 16 to initiate a call directly without employing anchoring in the MS 12 (step 410). Further details regarding initiating such calls and making decisions as to whether anchoring in the MS 12 is required are provided in the following communication flows.

Figure 11A:
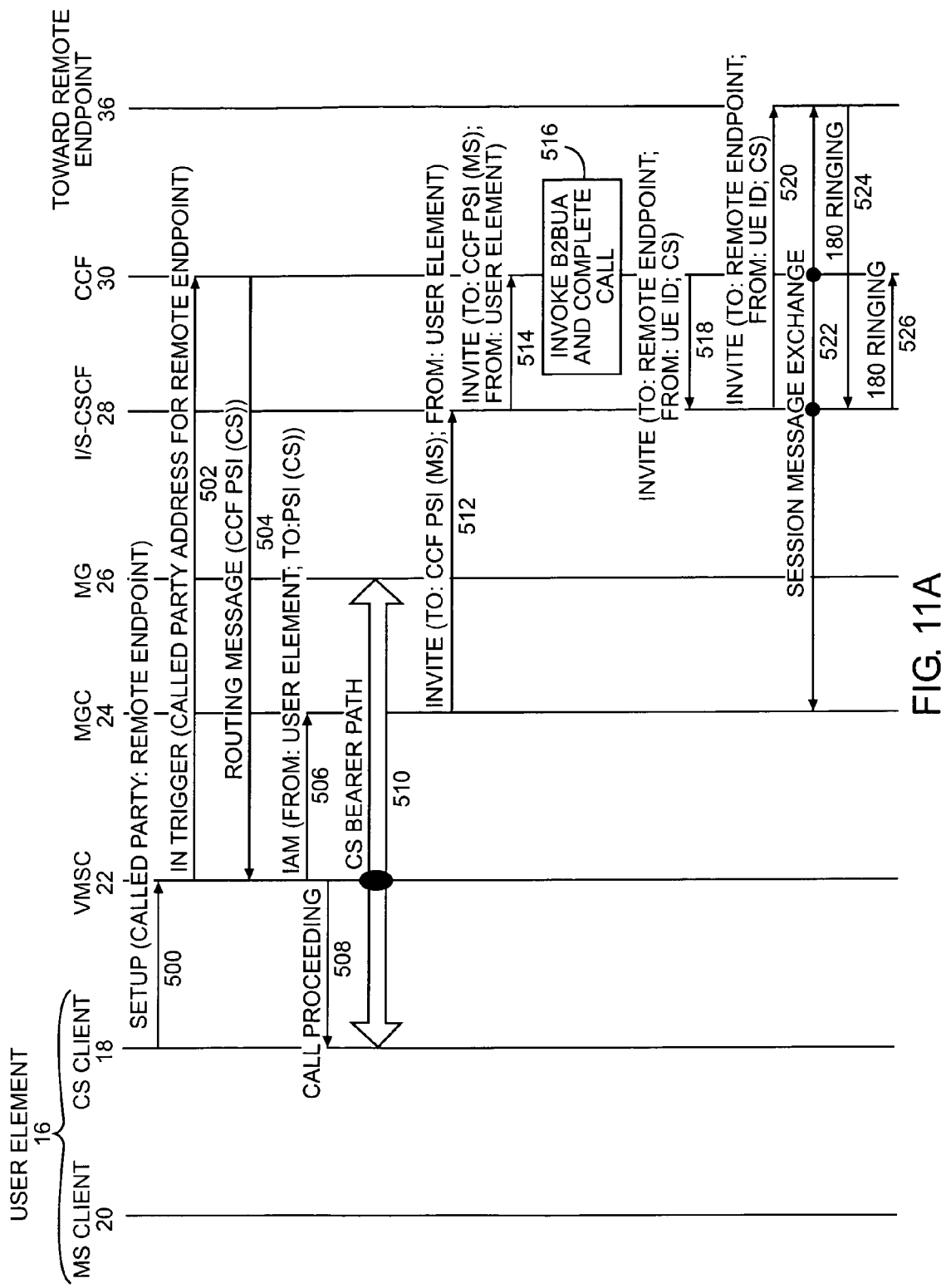
FIGS. 11A and 11B show a communication flow illustrating originating a call via the circuit-switched subsystem where call anchoring is provided in the multimedia subsystem according to one embodiment of the present invention.
Figure 11B:
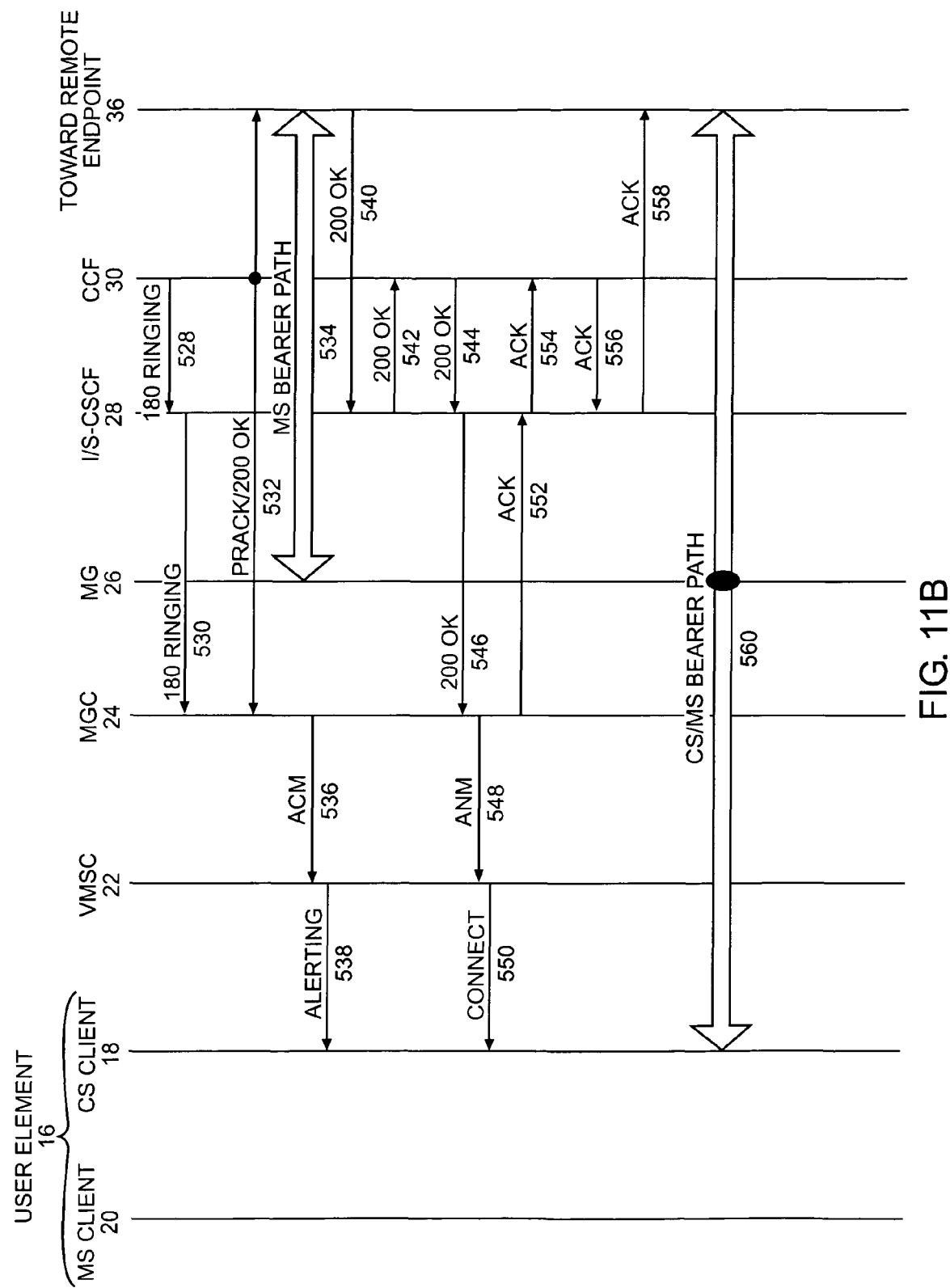

With reference to FIGS. 11A and 11B, a communication flow is provided to illustrate origination of a call from the CS client 18 of the user element 16 via the CS 14, when the user element 16 is within the MS anchoring zone. Initially, the CS client 18 will send a call setup message to its supporting VMSC 22 (step 500). The call setup message will identify the directory number of the remote endpoint 36. An originating IN trigger will cause the called party address for the remote endpoint 36 to be sent to the CCF 30 (step 502), which will store the called party address for later call completion. The CCF 30 will return an IN routing message, telling the VMSC 22 to route the call toward the CCF PSI (CS) address (step 504). In response, the VMSC 22 will send an Integrated Services User Part (ISUP) Initial Address Message (IAM) to the media gateway controller 24 with the CS PSI for the CCF 30 (step 506). The VMSC 22 will also provide a Call Proceeding message back to the CS client 18 of the user element 16 (step 508). This exchange results in a CS bearer leg being established from the CS client 18 to the media gateway 26 via the VMSC 22 (step 510). The media gateway controller 24 will act as a user agent on behalf of the user element 16.

Upon receiving the IAM from the VMSC 22, the media gateway controller 24 will send an Invite to the I/S-CSCF 28 to initiate establishment of an MS bearer leg toward the CCF 30 from the media gateway 26 (step 512). When generating the Invite, the media gateway controller 24 will identify the MS-based PSI for the CCF 30 in light of the CS-based PSI received in the IAM. The MS-based PSI for the CCF 30 is the address to which the Invite is sent. The Invite will also identify the user element 16 as the originator of the call. The Invite may also indicate that the call was originated through the CS 14. The I/S-CSCF 28 will send the Invite to the CCF 30 (step 514), which will invoke a back-to-back user agent (B2BUA) and then take the necessary steps to complete the call (step 516) by associating the call to called party address of the remote endpoint 36 stored previously in step 502. As such, the CCF 30 will send an Invite back to the I/S-CSCF 28 to complete the call (step 518). The Invite will now include the address of the remote endpoint 36 or a supporting node with which a packet session can be established. The Invite will identify the media gateway controller 24 of the media gateway 26 as the other endpoint for the packet session that will support the call. The I/S-CSCF 28 will then send the Invite toward the remote endpoint 36 (step 520). At this point, the traditional session message exchange between the remote endpoint 36 and the media gateway controller 24 will take place through the CCF 30, which is the anchor point for call signaling, and the I/S0-CSCF 28 to prepare the respective remote endpoint 36 and media gateway 26 to support the MS bearer leg (step 522).

In the meantime, the I/S-CSCF 28 may receive various signaling back from the remote endpoint 36, such as a 180 Ringing message (step 524). The 180 Ringing message indicates that the call is being presented to the remote endpoint 36. The I/S-CSCF 28 will route all signaling messages through the CCF 30, and as such, the 180 Ringing message is sent to the CCF 30 (step 526), which will forward the message back to the I/S-CSCF 28 (step 528). The I/S-CSCF 28 will send the 180 Ringing message to the media gateway controller 24 (step 530). After a Provisional Acknowledgement (PRACK) and 200 OK message exchange between the media gateway controller 24 and the remote endpoint 36 through the CCF 30 (step 532), the MS bearer path is effectively established (step 534), which means that the media gateway 26 and the remote endpoint 36 can send packets back and forth in association with the call.

The media gateway controller 24 will send an Address Complete Message (ACM) to the VMSC 22 (step 536), which will send an Alerting message to the user element 16 to indicate that call is being presented to the remote endpoint 36 (step 538). When the call is answered by the remote endpoint 36, the I/S-CSCF 28 will receive a 200 OK message (step 540) and route the 200 OK message to the CCF 30 (step 542). The CCF 30 will process the message if necessary, and then send the message back to the I/S-CSCF 28 (step 544), which will forward the 200 OK message to the media gateway controller 24 (step 546). The media gateway controller 24 will send an Answer Message (ANM) to the VMSC 22 (step 548), which will send a Connect message to the CS client 18 (step 550) to indicate that the call has been answered. To complete the call, the media gateway controller 24 will provide appropriate signaling to the media gateway 26, as well as send an acknowledgement (ACK) message back to the I/S-CSCF 28 (step 552). The I/S-CSCF 28 will again forward the ACK to the CCF 30 (step 554), which will forward the message back to the I/S-CSCF 28 (step 556). The I/S-CSCF 28 will then send the ACK toward the remote endpoint 36 (step 558).

At this point, a CS/MS bearer path is established between the CS client 18 of the user element 16 and the remote endpoint 36 via the media gateway 26 (step 560). Further, the call will be anchored in the MS 12, with all call signaling associated with the call routed through the CCF 30. Notably, the back-to-back user agent invoked by the CCF 30 is the function that represents an endpoint for signaling associated with the remote signaling leg as well as an endpoint for the access signaling leg. The back-to-back user agent will provide any necessary processing or filtering and then relay messages over the respective access and remote signaling legs.

Figure 12A:
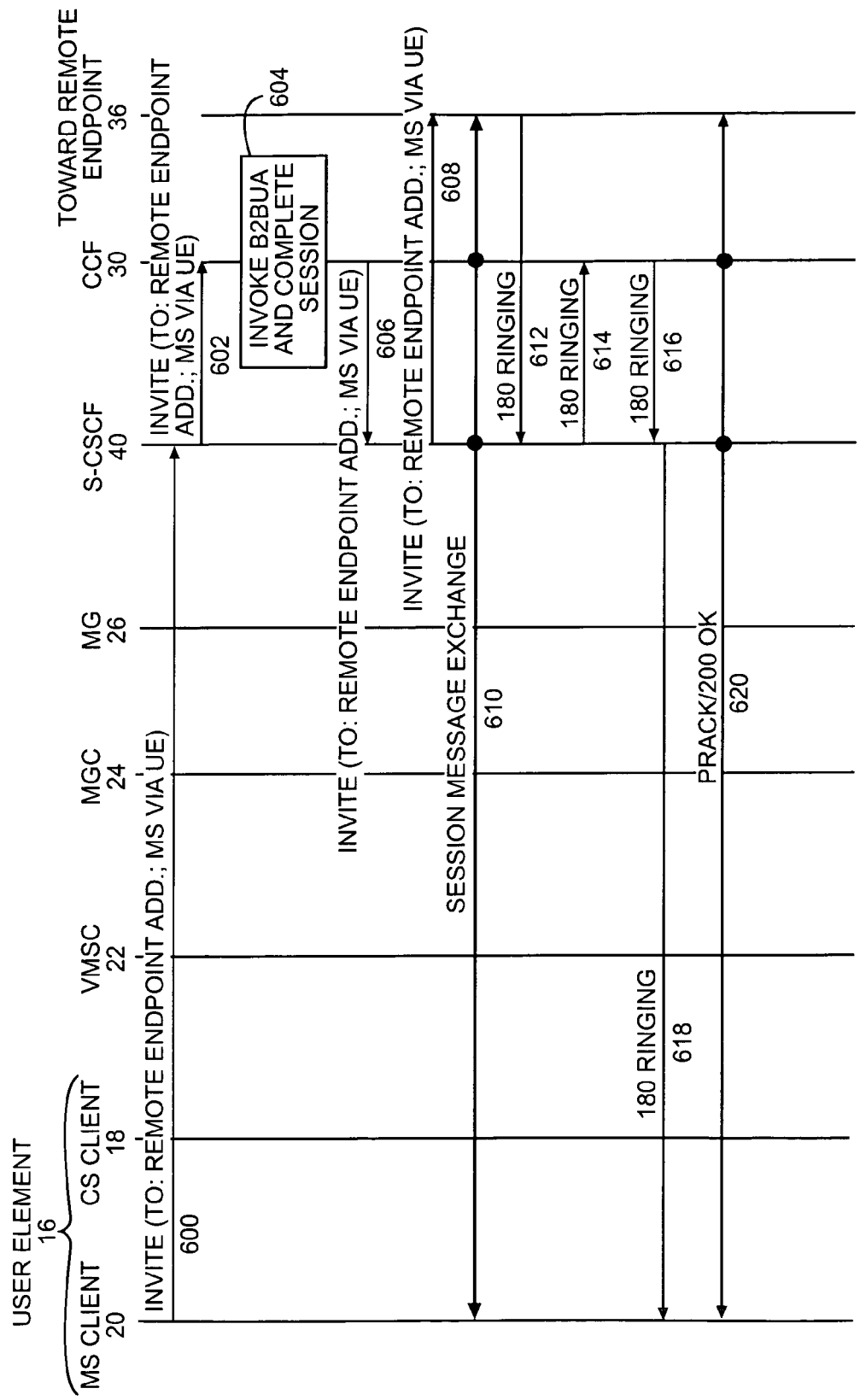
FIGS. 12A and 12B show a communication flow illustrating originating a call via the multimedia subsystem where call anchoring is provided in the multimedia subsystem according to one embodiment of the present invention.
Figure 12B:
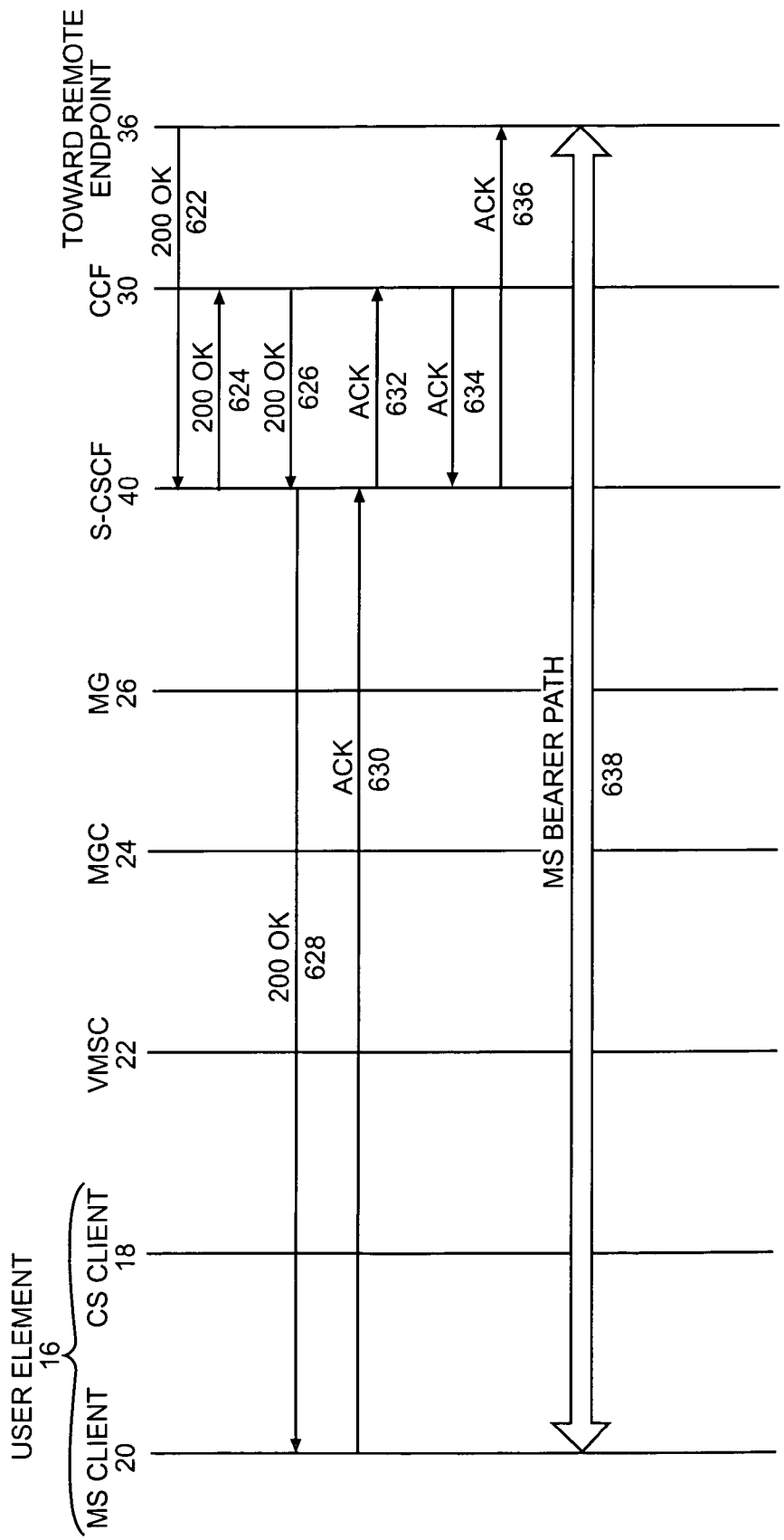

With reference to FIGS. 12A and 12B, a communication flow is provided for originating a call from the MS client 20 of the user element 16, when the user element 16 is within the MS anchoring zone. Initially, the MS client 20 of the user element 16 will register with the MS 12, which will result in the user element 16 being assigned to the S-CSCF 40 (step not shown). To initiate a call, the MS client 20 of the user element 16 will send an Invite, which will be directed to the S-CSCF 40 (step 600). The Invite will identify the remote endpoint address to which the call is intended, and will include an indication that the call will be supported by the MS client 20 through the MS 12 (without involving the CS 14). The S-CSCF 40 will use the filter criteria associated with the user element 16 to determine that the call should be anchored in the MS 12 and call routing should be sent to the CCF 30, and as such, will send the Invite to the CCF 30 (step 602). The CCF 30 will invoke the back-to-back user agent and take the necessary steps to complete the session (step 604). As such, the CCF 30 will send an Invite toward the remote endpoint 36 via the S-CSCF 40 (steps 606 and 608). The MS client 20 of the user element 16 and the remote endpoint 36 will provide the requisite session message exchange to support an MS bearer path via the S-CSCF 40 and CCF 30 (step 610).

Once the call is presented to the remote endpoint 36, the S-CSCF 40 will receive a 180 Ringing message (step 612). The 180 Ringing message is sent to the CCF 30 (step 614), which will send the 180 Ringing message back to the S-CSCF 40 (step 616). Again, the S-CSCF 40 will ensure that all call signaling is routed through the CCF 30. The S-CSCF 40 will send the 180 Ringing message to the MS client 20 of the user element 16 (step 618), wherein the user element 16 and the remote endpoint 36 will exchange the requisite PRACK and 200 OK messages via the S-CSCF 40 and the CCF 30 (step 620). When the call is answered at the remote endpoint 36, the S-CSCF 40 will receive a 200 OK message (step 622). The S-CSCF 40 will route the 200 OK message through the CCF 30 (steps 624 and 626) and then send the 200 OK message to the MS client 20 of the user element 16 (step 628). The MS client 20 of the user element 16 will respond with an Acknowledgement message, which is received at the S-CSCF 40 (step 630). The S-CSCF 40 will send the Acknowledgement message through the CCF 30 (steps 632 and 634) and then forward the Acknowledgement message toward the remote endpoint 36 (step 636). At this point, an MS bearer path is established between the MS client 20 of the user element 16 and the remote endpoint 36 through the MS 12, without engaging the CS 14 (step 638). However, all call signaling is routed through the CCF 30 by the S-CSCF 40, such that the CCF 30 may remain an anchor for the call in case additional services are required or a transfer of the bearer path through the CS 14 is necessary or desired.

Figure 13A:
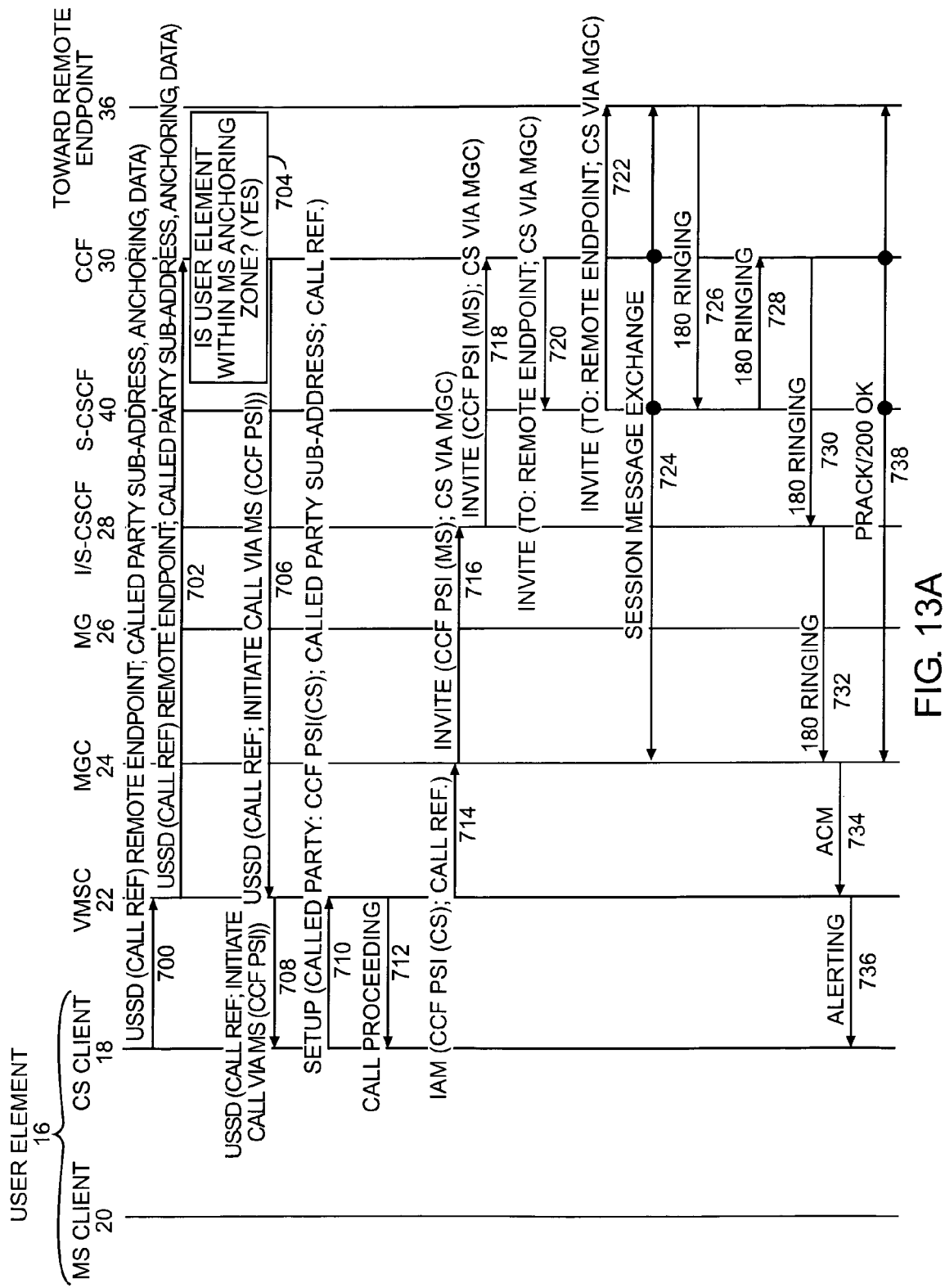
FIGS. 13A and 13B show a communication flow illustrating originating a call via the circuit-switched subsystem where call anchoring is provided in the multimedia subsystem according to an alternative embodiment of the present invention.
Figure 13B:
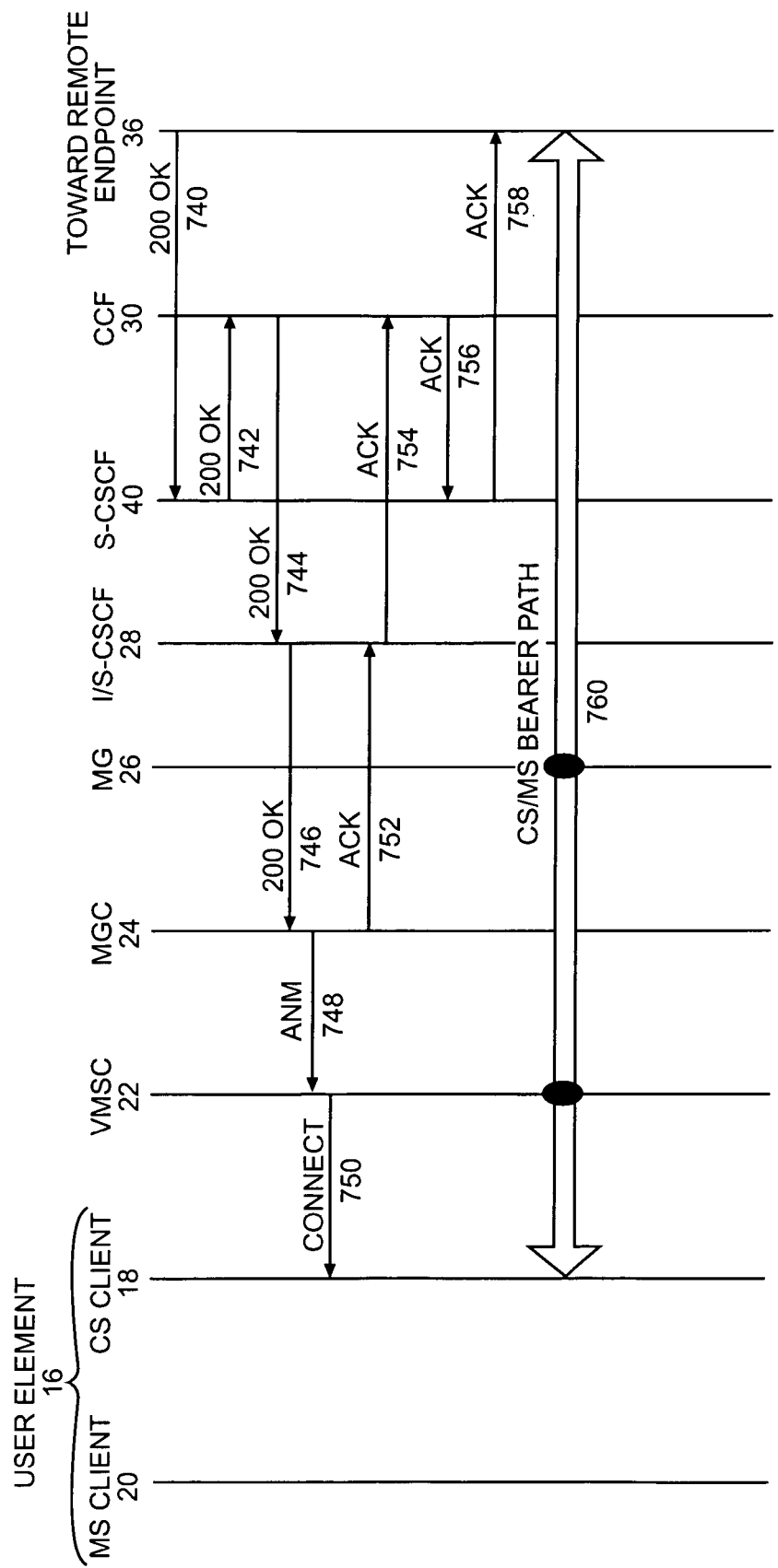

With reference to FIGS. 13A and 13B, an alternative technique is illustrated where the user element 16 will initiate outgoing calls to the remote endpoint 36 by initiating a call to the CCF 30, when the user element 16 is within the MS anchoring zone. An alternate signaling channel, such as an USSD channel, is used to provide information identifying anchoring data and the remote endpoint 36 to the CCF 30. In this embodiment, the CCF 30 includes decision logic to determine if and when to invoke the CCF 30 as an anchoring point for call signaling.

Upon determining a need to initiate a call, the user element 16 will employ a USSD operation to determine if call should be anchored at the CCF 30. The user's identity, called party number, call reference, anchoring data, and any other information required to complete the call to the remote endpoint 36 is sent in a USSD message to the VMSC 22 (step 700). The VMSC 22 will forward the USSD message to the CCF 30 or to the user's home location resource (HLR) (not shown), which will forward the message to the CCF 30 (step 702). The CCF 30 will process the information in the USSD message to determine whether the user element 16 is within the MS anchoring zone (step 704). If the user element 16 is within the MS anchoring zone, the CCF 30 will send to the VMSC 22 a USSD message including the call reference information and the instructions to initiate the call via the MS 12 using the CCF PSI (step 706). The VMSC 22 will forward the USSD message to the user element 16 (step 708).

Upon receipt of the USSD message, the CS client 18 of the user element 16 will send a Setup message to the VMSC 22 (step 710). The Setup message will indicate that a call is being originated to the CCF 30 using the CS PSI of the CCF 30 and may include a called party sub-address along with the call reference (CALL REF). The VMSC 22 will respond with a Call Proceeding message, which is received by the CS client 18 of the user element 16 (step 712).

Upon establishing resources for the originating leg, the VMSC 22 will attempt to complete the call to the CCF 30 via the media gateway controller 24. As such, the VMSC 22 will send an IAM to the media gateway controller 24 (step 714). The IAM will provide the call reference and identify the CS PSI for the CCF 30. In response, the media gateway controller 24 will send an Invite intended for the CCF 30 using the MS PSI for the CCF 30 and indicate that a call is being initiated from the CS 14 via the media gateway controller 24. The Invite will be received by the I/S-CSCF 28' (step 716), which will send the Invite to the CCF 30 (step 718).

The CCF 30 will use the call reference or other means, such as calling party number as available, to associate the information in the Invite with that provided by the USSD information. The CCF 30 will terminate the incoming call leg that was originated to the CS PSI of the CCF 30, and will invoke a back-to-back user agent to originate a session to the remote endpoint 36, which was the originally called party. The CCF 30 may access the HSS 34 to obtain the address for the S-CSCF 40 and then route the call toward the remote endpoint 36 via the S-CSCF 40 or the CCF 30 may route the call to the S-CSCF via an I-CSCF. Notably, a conversion may be necessary from the directory number associated with the remote endpoint 36 and the address necessary for routing the Invite. The CCF 30 will provide this functionality. Once the Invite is received by the S-CSCF 40 (step 720), the Invite is sent toward the remote endpoint 36 (step 722). The media gateway controller 24 and the remote endpoint 36 will then provide the requisite session message exchange, such that an MS bearer path can be established between the media gateway 26 and the remote endpoint 36 (step 724). The messages exchanged during the session message exchange will be routed through the CCF 30 and the S-CSCF 40.

When the call is presented to the remote endpoint 36, the S-CSCF 40 will receive a 180 Ringing message (step 726), and will forward the 180 Ringing message to the CCF 30 (step 728). The CCF 30 will send the 180 Ringing message to the I/S-CSCF 28' (step 730), which will send a 180 Ringing message to the media gateway controller 24 (step 732). The media gateway controller 24 will send an ACM to the VMSC 22 to indicate that the call is being presented to the remote endpoint 36 (step 734). The VMSC 22 will then send an appropriate Alerting message to the CS client of the user element 16 (step 736). Meanwhile, the PRACK and 200 OK message exchange will take place between the media gateway controller 24 and the remote endpoint 36 via the S-CSCF 40 and the CCF 30 (step 738).

When the remote endpoint 36 is answered, the S-CSCF 40 will receive a 200 OK message (step 740), and send a 200 OK message to the CCF 30 (step 742). The CCF 30 will send a 200 OK message to the I/S-CSCF 28' (step 744), which will send the 200 OK message to the media gateway controller 24 (step 746). In response, the media gateway controller 24 will send an ANM to the VMSC 22 (step 748), which will send a Connect message to the CS client 18 of the user element 16 (step 750). The media gateway controller 24 will also send an Acknowledgement in response to the 200 OK message to the I/S-CSCF 28' (step 752). The I/S-CSCF 28' will forward the Acknowledgement to the CCF 30 (step 754), which will send the Acknowledgement message to the S-CSCF 40 (step 756). The S-CSCF 40 will then send the Acknowledgement message toward the remote endpoint 36 (step 758). Again, all messaging is routed through the CCF 30 by the S-CSCF 40. With the above, a CS/MS bearer path is established between the CS client 18 of the user element 16 and the remote endpoint 36 via the media gateway 26 and the VMSC 22 (step 760). The call is again anchored in the MS 12.

Figure 14:
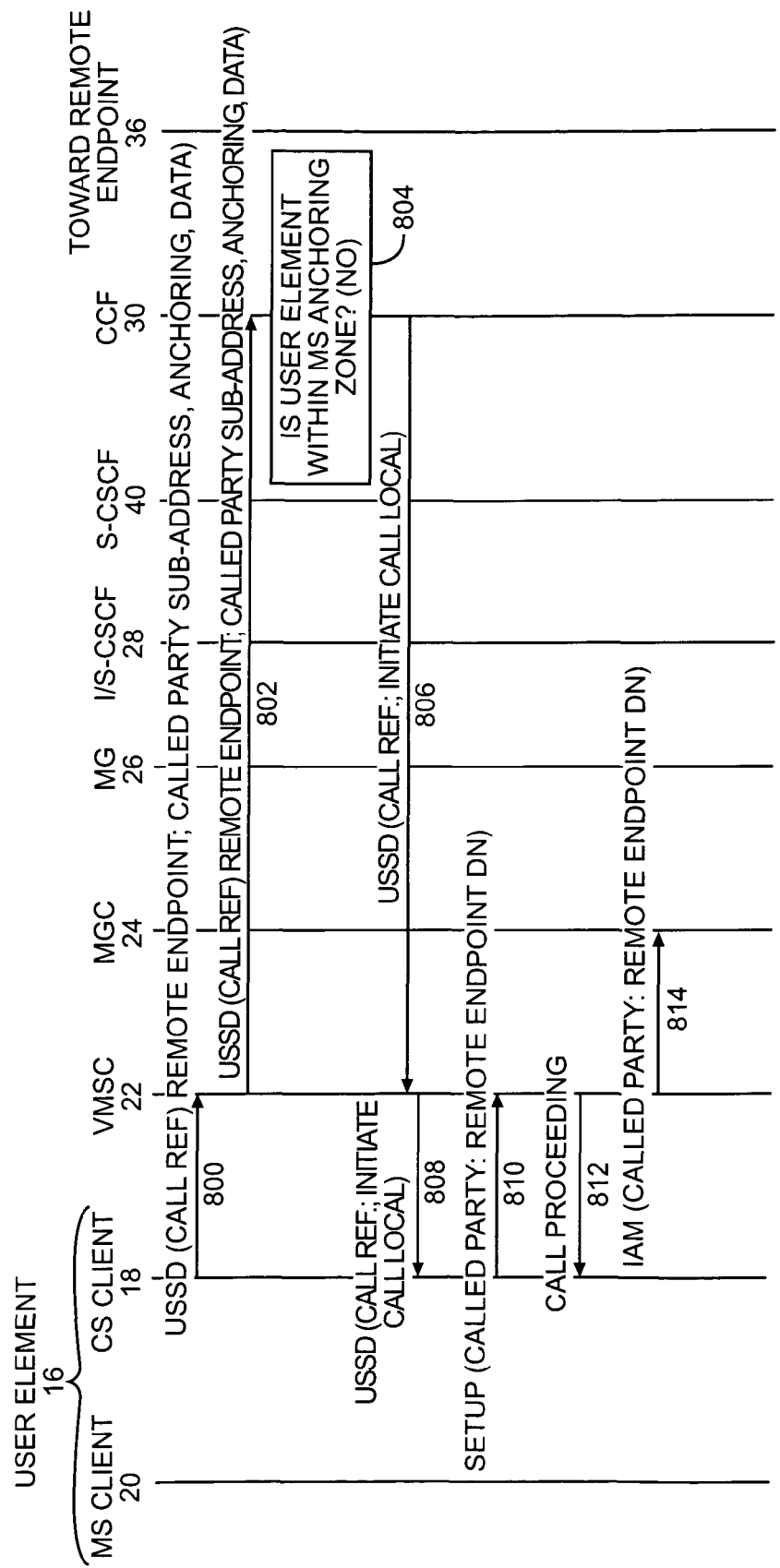
FIG. 14 shows a communication flow illustrating originating a call via the circuit-switched subsystem where call anchoring is not provided in the multimedia subsystem according to an alternative embodiment of the present invention.

With reference to FIG. 14, an alternative technique is illustrated where the user element 16 will initiate outgoing calls directly to the remote endpoint 36 without invoking routing the call to the CCF 30, when the user element 16 is not within the MS anchoring zone. As was shown in FIGS. 13A and 13B, the USSD channel is used to provide information identifying anchoring data and the remote endpoint 36 to the CCF 30. The CCF 30 determines if and when to invoke the CCF 30 as an anchoring point for call signaling.

Upon determining a need to initiate a call, the user element 16 will employ a USSD operation to determine if call should be anchored at the CCF 30. The user's identity, called party number, call reference, anchoring data, and any other information required to complete the call to the remote endpoint 36 is sent in a USSD message to the VMSC 22 (step 800). The VMSC 22 will forward the USSD message to the CCF 30 or to the user's home location resource (HLR) (not shown), which will forward the message to the CCF 30 (step 802). The CCF 30 will process the information in the USSD message to determine whether the user element 16 is within the MS anchoring zone (step 804). If the user element 16 is not within the MS anchoring zone, the CCF 30 will send to the VMSC 22 a USSD message including the call reference information and the instructions to directly or locally initiate the call to the remote endpoint 36 using the directory number of the called party instead of via the MS 12 using the CCF PSI (step 806). The VMSC 22 will forward the USSD message to the user element 16 (step 808).

Upon receipt of the USSD message, the CS client 18 of the user element 16 will send a Setup message to the VMSC 22 (step 810). The Setup message will indicate that a call is being directly originated to the remote endpoint 36 using the directory number of the called party. The VMSC 22 will respond with a Call Proceeding message, which is received by the CS client 18 of the user element 16 (step 812). Upon establishing resources for the originating leg, the VMSC 22 will attempt to complete the call to the remote endpoint 36. As such, the VMSC 22 will send an IAM directly toward the remote endpoint 36 without invoking the services of the CCF 30 (step 814).

Figure 15:
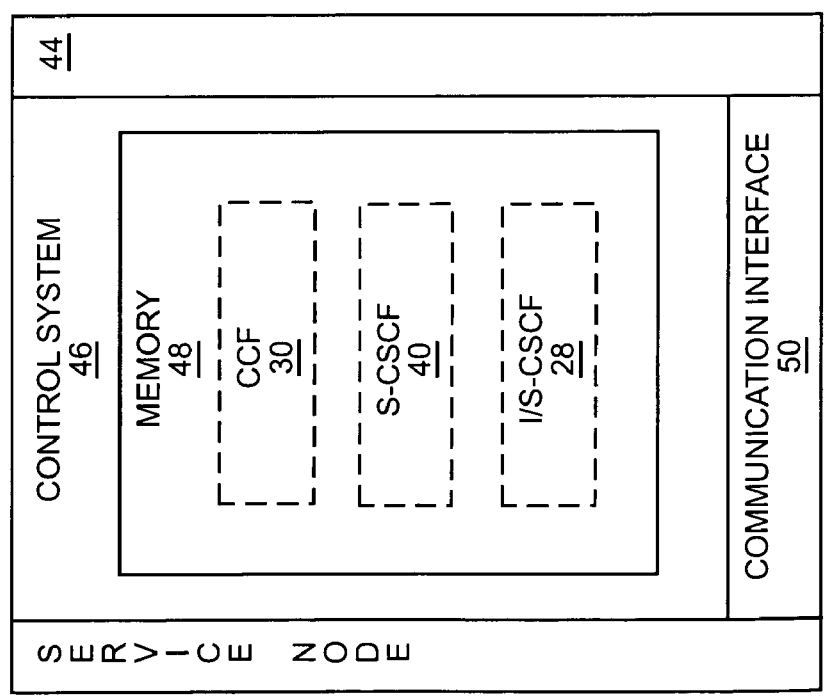
FIG. 15 is a block representation of a service node according to one embodiment of the present invention.

With reference to FIG. 15, a service node 44 is provided according to one embodiment of the present invention. The service node 44 may reside in the MS 12 and include a control system 46 and associated memory 48 to provide the functionality for any one or a combination of the following: the CCF 30, the S-CSCF 40, and the I/S-CSCF 28. The control system 46 will also be associated with a communication interface 50 to facilitate communications with any entity affiliated with the MS 12 or appropriately associated networks.

Figure 16:
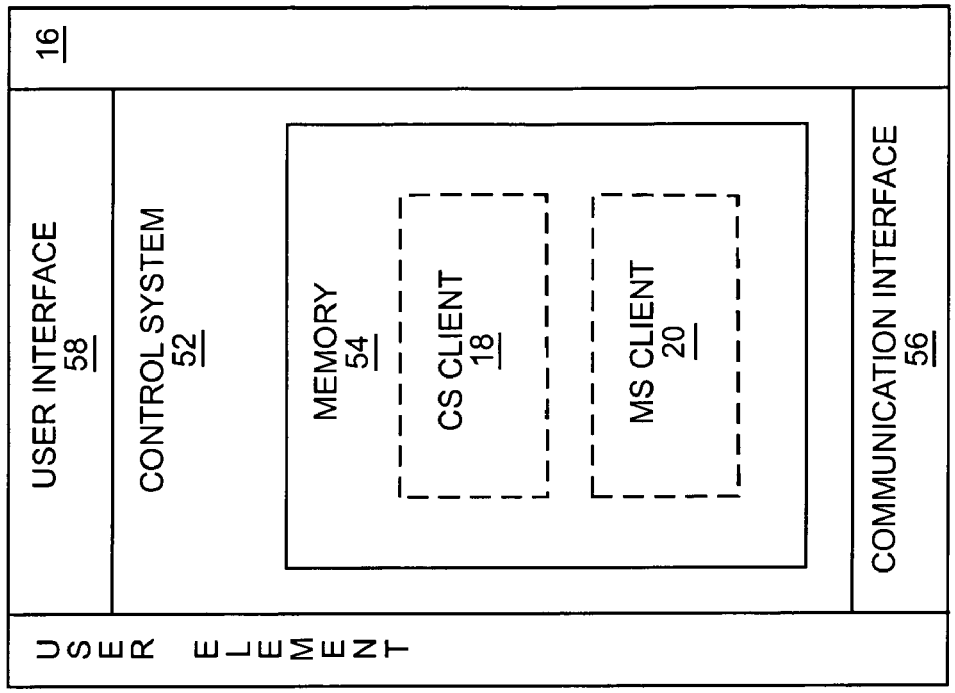
FIG. 16 is a block representation of a user element according to one embodiment of the present invention.

With reference to FIG. 16, a block representation of a user element 16 is provided. The user element 16 may include a control system 52 having sufficient memory 54 to support operation of the CS client 18 and the MS client 20. The control system 52 will cooperate closely with a communication interface 56 to allow the CS client 18 and the MS client 20 to facilitate communications over the CS 14 or the MS 12 as described above. The control system 52 may also be associated with a user interface 58, which will facilitate interaction with the user. The user interface 58 may include a microphone and speaker to facilitate voice communications with the user, as well as a keypad and display to allow the user to input and view information.

Those skilled in the art will recognize improvements and modifications to the preferred embodiments of the present invention. All such improvements and modifications are considered within the scope of the concepts disclosed herein and the claims that follow.

What is claimed is:

1. A method of selectively anchoring calls for a user element in a multimedia subsystem comprising:
    determining when the user element is in a multimedia subsystem (MS) anchoring zone associated with the multimedia subsystem, the multimedia subsystem comprising a home multimedia system of the user element and wherein the multimedia subsystem anchoring zone corresponds to a plurality of different cells supported by a circuit switched subsystem and a plurality of different Wireless Local Area Network (WLAN) zones supported by the MS for which call control should be anchored in the home multimedia subsystem;
    effecting establishment of a call with the user element such that the call is anchored in the home multimedia subsystem when the user element is in the multimedia subsystem anchoring zone, wherein anchoring the call includes passing all call signaling through a continuity control function (CCF) in the home multimedia subsystem, such that the same CCF terminates an access signaling leg with the user element and a signaling leg with a remote endpoint of the call; and
    effecting establishment of the call with the user element such that the call is not anchored in the multimedia subsystem when the user element is not in the multimedia subsystem anchoring zone, wherein when the user element is served by the circuit switched subsystem, effecting establishment of the call comprises instructing a node on the circuit-switched subsystem to route the call initiated by the user element toward a call continuity control function of the multimedia subsystem when the user is in the multimedia subsystem anchoring zone, such that the call is anchored at the continuity control function, and instructing the node on the circuit switched subsystem to route the call initiated by the user element toward a called party when the user is not in the multimedia subsystem anchoring zone.

2. The method of claim 1 wherein determining when the user element is in the multimedia subsystem anchoring zone further comprises:
    obtaining anchoring data identifying at least one of the group consisting of a base station, local wireless access point, cell, local wireless zone, switch, or network, which is currently available to support communications with the user element; and
    comparing the anchoring data with the multimedia subsystem anchoring zone to determine when the user element is within the multimedia subsystem anchoring zone.

3. The method of claim 2 wherein obtaining the anchoring data comprises receiving the anchoring data from the user element or a node associated with the user element.

4. The method of claim 1 further comprising:
    obtaining anchoring data identifying at least two of the group consisting of a base station, local wireless access point, cell, local wireless zone, switch, or network, which is currently available to support communications with the user element; and
    defining the multimedia subsystem anchoring zone based on the anchoring data.

5. The method of claim 1 wherein effecting establishment of the call comprises initiating the call toward the call continuity control function of the multimedia subsystem when the user is in the multimedia subsystem anchoring zone, such that the call is anchored at the continuity control function, and initiating the call toward a called party when the user is not in the multimedia subsystem anchoring zone.

6. The method of claim 1 wherein effecting establishment of the call comprises instructing the user element to initiate the call toward the call continuity control function of the multimedia subsystem when the user is in the multimedia subsystem anchoring zone, such that the call is anchored at the continuity control function, and instructing the user element to initiate the call toward a called party when the user is not in the multimedia subsystem anchoring zone.

7. The method of claim 1 further comprising effecting establishment of the call with the user element such that the call is anchored in the multimedia subsystem when the user element is not in the multimedia subsystem anchoring zone, and the call is being initiated from the user element to a called party served by the multimedia subsystem.

8. The method of claim 1 wherein the multimedia subsystem anchoring zone comprises an area served by the circuit-switched subsystem.

9. The method of claim 1 wherein the multimedia subsystem anchoring zone comprises an area served by the multimedia subsystem.

10. The method of claim 1 wherein the multimedia subsystem anchoring zone comprises an area served by the multimedia subsystem and an area served by the circuit-switched subsystem.

11. The method of claim 1 wherein the multimedia subsystem anchoring zone comprises an area served by both the multimedia subsystem and the circuit-switched subsystem.

12. An apparatus for selectively anchoring calls for a user element in a multimedia subsystem comprising:
- at least one communication interface; and
- a control system associated with the at least one communication interface and adapted to:
  - determine when the user element is in a multimedia subsystem anchoring zone associated with the multimedia subsystem, the multimedia subsystem comprising a home multimedia subsystem of the user element and wherein the multimedia subsystem anchoring zone corresponds to a plurality of different cells supported by a circuit switched subsystem and a plurality of different Wireless Local Area Network (WLAN) zones supported by the MS for which call control should be anchored in the home multimedia subsystem;
  - effect establishment of the call with the user element such that the call is anchored in the multimedia subsystem when the user element is in the multimedia subsystem anchoring zone, wherein anchoring the call includes passing all call signaling through a continuity control function (CCF) in the home multimedia subsystem, such that the same CCF terminates an access signaling leg with the user element and a signaling leg with a remote endpoint of the call; and
  - effect establishment of the call with the user element such that the call is not anchored in the multimedia subsystem when the user element is not in the multimedia subsystem anchoring zone wherein when the user element is served by a circuit-switched subsystem, to effect establishment of the call, the control system is further adapted to instruct a node on the circuit-switched subsystem to route the call initiated by the user element toward a call continuity control function of the multimedia subsystem when the user is in the multimedia subsystem anchoring zone, such that the call is anchored at the continuity control function, and instruct the node on the circuit-switched subsystem to route the call initiated by the user element toward a called party when the user is not in the multimedia subsystem anchoring zone.

13. The apparatus of claim 12 wherein to determine when the user element is in the multimedia subsystem anchoring zone, the control system is further adapted to:
- obtain anchoring data identifying at least one of the group consisting of a base station, local wireless access point, cell, local wireless zone, switch, or network, which is currently available to support communications with the user element; and
- compare the anchoring data with the multimedia subsystem anchoring zone to determine if the user element is within the multimedia subsystem anchoring zone.

14. The apparatus of claim 13 wherein to obtain the anchoring data, the control system is further adapted to receive the anchoring data from the user element or a node associated with the user element.

15. The apparatus of claim 12 wherein the control system is further adapted to:
- obtain anchoring data identifying at least two of the group consisting of a base station, local wireless access point, cell, local wireless zone, switch, or network, which is currently available to support communications with the user element; and
- define the multimedia anchoring zone based on the anchoring data.

16. The apparatus of claim 12 wherein to effect establishment of the call, the control system is further adapted to initiate the call toward the call continuity control function of the multimedia subsystem when the user is in the multimedia subsystem anchoring zone, such that the call is anchored at the continuity control function, and initiate the call toward a called party when the user is not in the multimedia subsystem anchoring zone.

17. The apparatus of claim 12 wherein to effect establishment of the call, the control system is further adapted to instruct the user element to initiate the call toward the call continuity control function of the multimedia subsystem when the user is in the multimedia subsystem anchoring zone, such that the call is anchored at the continuity control function, and instruct the user element to initiate the call toward a called party when the user is not in the multimedia subsystem anchoring zone.

18. The apparatus of claim 12 wherein the control system is further adapted to effect establishment of the call with the user element such that the call is anchored in the multimedia subsystem when the user element is not in the multimedia subsystem anchoring zone and the call is being initiated from the user element to a called party served by the multimedia subsystem.

19. The apparatus of claim 12 wherein the multimedia subsystem anchoring zone comprises an area served by the circuit-switched subsystem.

20. The apparatus of claim 12 wherein the multimedia subsystem anchoring zone comprises an area served by the multimedia subsystem.

21. The apparatus of claim 12 wherein the multimedia subsystem anchoring zone comprises an area served by the multimedia subsystem and an area served by the circuit-switched subsystem.

22. The apparatus of claim 12 wherein the multimedia subsystem anchoring zone comprises an area served by both the multimedia subsystem and the circuit-switched subsystem.

23. The apparatus of claim 12 wherein the apparatus is the user element.

24. The apparatus of claim 12 wherein the apparatus is a service node in the multimedia subsystem at which the call is anchored when the user element is within the multimedia subsystem anchoring zone.

25. The method of claim 1 wherein the multimedia subsystem anchoring zone defines an area or areas where calls for the user element should be anchored in the multimedia subsystem.

26. The method of claim 1 wherein the CCF determines whether the user element is within the multimedia subsystem call anchoring zone.

27. The apparatus of claim 12 wherein the CCF determines whether the user element is within the multimedia subsystem call anchoring zone.

* * * * *